United States Patent
Lu et al.

(10) Patent No.: US 8,847,880 B2
(45) Date of Patent: Sep. 30, 2014

(54) METHOD AND APPARATUS FOR PROVIDING MOTION LIBRARY

(75) Inventors: Ying-Ko Lu, Taoyuan County (TW);
Shun-Nan Liou, Kaohsiung (TW);
Zhou Ye, Foster City, CA (US);
Chin-Lung Li, Taoyuan County (TW)

(73) Assignee: Cywee Group Ltd., Taipei (TW)

( * ) Notice: Subject to any disclaimer, the term of this patent is extended or adjusted under 35 U.S.C. 154(b) by 768 days.

(21) Appl. No.: 13/164,790

(22) Filed: Jun. 21, 2011

(65) Prior Publication Data

US 2011/0248915 A1  Oct. 13, 2011

Related U.S. Application Data

(63) Continuation-in-part of application No. 12/647,397, filed on Dec. 25, 2009, now abandoned.

(60) Provisional application No. 61/225,555, filed on Jul. 14, 2009.

(51) Int. Cl.
| G06F 3/038 | (2013.01) |
| G06F 3/01 | (2006.01) |
| G06F 3/0346 | (2013.01) |
| A63F 13/40 | (2014.01) |
| A63F 13/20 | (2014.01) |

(52) U.S. Cl.
CPC ............... *A63F 13/06* (2013.01); *G06F 3/017* (2013.01); *A63F 2300/6045* (2013.01); *G06F 3/0346* (2013.01); *A63F 2300/1031* (2013.01); *A63F 13/10* (2013.01); *G06F 3/038* (2013.01); *A63F 2300/105* (2013.01)

USPC .......................................... 345/156; 715/863

(58) Field of Classification Search
USPC .......................................... 345/156; 715/863
See application file for complete search history.

(56) References Cited

U.S. PATENT DOCUMENTS

| 6,326,971 | B1 | 12/2001 | Van Wieringen | |
| 7,536,269 | B2 | 5/2009 | Sierer et al. | |
| 7,783,423 | B2 | 8/2010 | Verma et al. | |
| 7,846,027 | B2 * | 12/2010 | Meyer | 463/46 |
| 2005/0001842 | A1 * | 1/2005 | Park et al. | 345/474 |
| 2008/0090656 | A1 * | 4/2008 | Hartwig | 463/30 |
| 2009/0082108 | A1 * | 3/2009 | Ye | 463/39 |
| 2010/0149740 | A1 * | 6/2010 | Cheng | 361/679.4 |
| 2010/0171696 | A1 * | 7/2010 | Wu | 345/158 |
| 2010/0251231 | A1 | 9/2010 | Coussemaeker et al. | |

* cited by examiner

*Primary Examiner* — Jonathan Boyd
(74) *Attorney, Agent, or Firm* — Ding Yu Tan

(57) ABSTRACT

A method and an apparatus for providing a motion library, adapted to a service end device to provide a customized motion library supporting recognition of at least one motion pattern for a user end device. At least one sensing component disposed on the user end device is determined. At least one motion group is determined according to the determined sensing components, wherein each motion group comprises at least one motion pattern. The at least one motion pattern is selected and a motion database to is queried to display a list of the motion groups corresponding to the selected motion patterns and the motion groups are selected from the list. The motion patterns belonging to the motion groups are selected to re-compile the customized motion library, which is provided for the user end device, so as to enable the user end device to recognize the selected motion patterns.

20 Claims, 25 Drawing Sheets

METHOD AND APPARATUS FOR PROVIDING MOTION LIBRARY

CROSS-REFERENCE TO RELATED APPLICATION

This application is a continuation-in-part application of and claims the priority benefit of a prior application Ser. No. 12/647,397, filed on Dec. 25, 2009, now pending. The prior application Ser. No. 12/647,397 claims the priority benefit of U.S. provisional application Ser. No. 61/225,555, filed on Jul. 14, 2009. The entirety of each of the above-mentioned patent applications is hereby incorporated by reference herein and made a part of this specification.

BACKGROUND OF THE INVENTION

1. Field of the Invention

The present invention generally relates to a method and an apparatus for motion recognition, and more particularly, to a method and an apparatus for providing a customized motion library supporting recognition of motion patterns.

2. Description of Related Art

Nowadays, Virtual Reality Motion Sensing (VRMS) technique has become a mainstream in the game field. Through the detection of motion sensors disposed on a game controller, the motion or gestures performed by the user, even the positions or angles of the user can be precisely recognized. The recognition result is further applied to game control, thus providing users with reality to interact with the game, namely, a somatosensory game.

To support the recognition of complex motion, various motion sensors including a G-sensor, a gyro sensor, and a magnetic sensor are adopted to respectively detect the acceleration, angular velocity, and direction of a movement of the device. The parameters generated by the motion sensors are referred to a previously defined motion library, so as to recognize the motion performed by the user.

For example, FIG. 1 is a schematic diagram illustrating a conventional method for recognizing user motion in a somatosensory game. Referring to FIG. 1, a game developer usually takes use of ordinary motion applications (APIs) (step S110), such as sensor data GetSensorData( ) Euler angle GetEulerAngle( ) rotation matrix GetRotMatrix( ) quaternion output GETQuat( ) gravity output GetGravity( ) and linear acceleration output GetLinearAcc( ) to recognize the motion performed by the user. Whenever a motion is performed on a device, a plurality of parameters are generated by the motion sensors of the device and input to a recognition engine 100 for calculation (step S120). Finally, a motion of a forehand smash is recognized according to the output of the motion applications (step S130) and a recognition result indicating the forehand smash is output to execute a corresponding game operation (step S140).

However, each of the motion applications may involve in complicated mathematical calculation. To deal with the recognition of various motion performed by the user, plenty of APIs have to be used and complicated calculation has to be carried out, which expends large sum of system resource and consumes plenty of time. Further, the motion patterns to be recognized have to be defined in advance by the manufacture and cannot be changed by the user, which is inconvenient for the user.

SUMMARY OF THE INVENTION

Accordingly, the present invention is directed to a method for providing a motion library, in which a motion library supporting the recognition of user-defined motion patterns is re-compiled in a service end device and provided for a user end device, so as to enable the user end device to recognize the motion patterns performed thereon.

The present invention provides a method for providing a motion library, adapted to a service end device to provide a customized motion library supporting recognition of at least one motion pattern for a user end device. First, at least one sensing component disposed on the user end device is determined. Next, at least one motion group is determined according to the determined sensing component, wherein each motion group comprises at least one motion pattern. Next, a motion database is queried to display a list of the motion groups corresponding to the determined sensing components and the motion groups are selected from the list. Then, one or a plurality of the motion patterns corresponding to the selected motion groups are selected. Finally, the motion patterns belonging to the motion groups are selected to re-compile the customized motion library and the customized motion library is provided for the user end device so as to enable the user end device to recognize the selected motion patterns.

The present invention provides an apparatus for providing a motion library, which comprises a storage module, a communication module, a determination module, an input module and a processing module. The storage module is configured to store a motion database, which records at least one motion library required for recognizing at least one motion pattern. The communication module is configured to connect with a user end device. The determination module is configured to determine at least one sensing component disposed on the user end device, and determine at least one motion group according to the determined at least one sensing component, wherein each motion group comprises at least one motion pattern. The input module is configured to receive a selecting operation of one or a plurality of the at least one motion pattern. The processing module is configured to query a motion database to display a list of the motion groups corresponding to the determined sensing components, selects the motion groups from the list, and selects the motion patterns belonging to the corresponding motion group to re-compile a customized motion library. Finally, the processing module provides the customized motion library for the user end device so as to enable the user end device to recognize the selected motion patterns.

The present invention provides a user with a flexibility to freely select favorite gestures or motion for operating functions of a device, in which a customized motion library supporting the recognition of the selected motion is re-compiled remotely and provided for the device. Accordingly, once the user performs the pre-selected motion on the device, the device may have a quick response and execute the function desired by the user.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
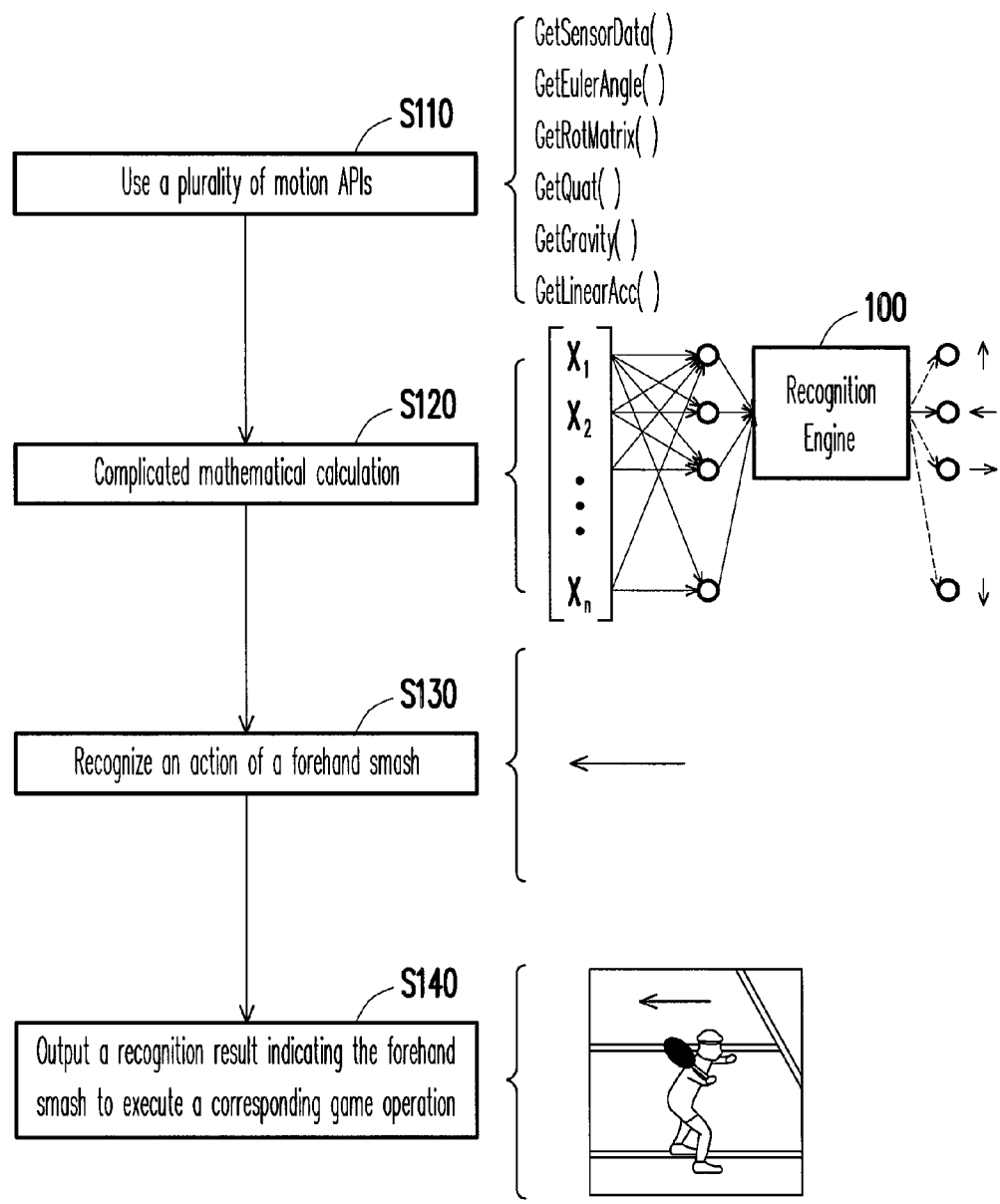
FIG. 1 is a schematic diagram illustrating a conventional method for recognizing user motion in a somatosensory game.

Reference will now be made in detail to the present preferred embodiments of the invention, examples of which are illustrated in the accompanying drawings. Wherever possible, the same reference numbers are used in the drawings and the description to refer to the same or like parts.

Current portable electronic devices such as smart phones, or personal digital assistants (PDA) are usually equipped with various motions sensors, which provide the possibility to monitor all kinds of movements of the device. Those movements are classified and defined as a plurality of motion patterns in the present invention and used as a user input for executing a device function or perform a device operation.

Since the motion library always changes in accordance with the number and type of motion patterns to be recognized, in the present invention, a customized motion library is re-compiled in a service end device according to the motion patterns selected by the user and provided for the user end device. Accordingly, the user end device is enabled to recognize the selected motion patterns. The re-compiled motion library may be downloaded and installed in the user end device, or stored in the service end device; either of the two scenarios may support the recognition of motion patterns. Accordingly, embodiments are respectively given below for further illustration.

Figure 2:
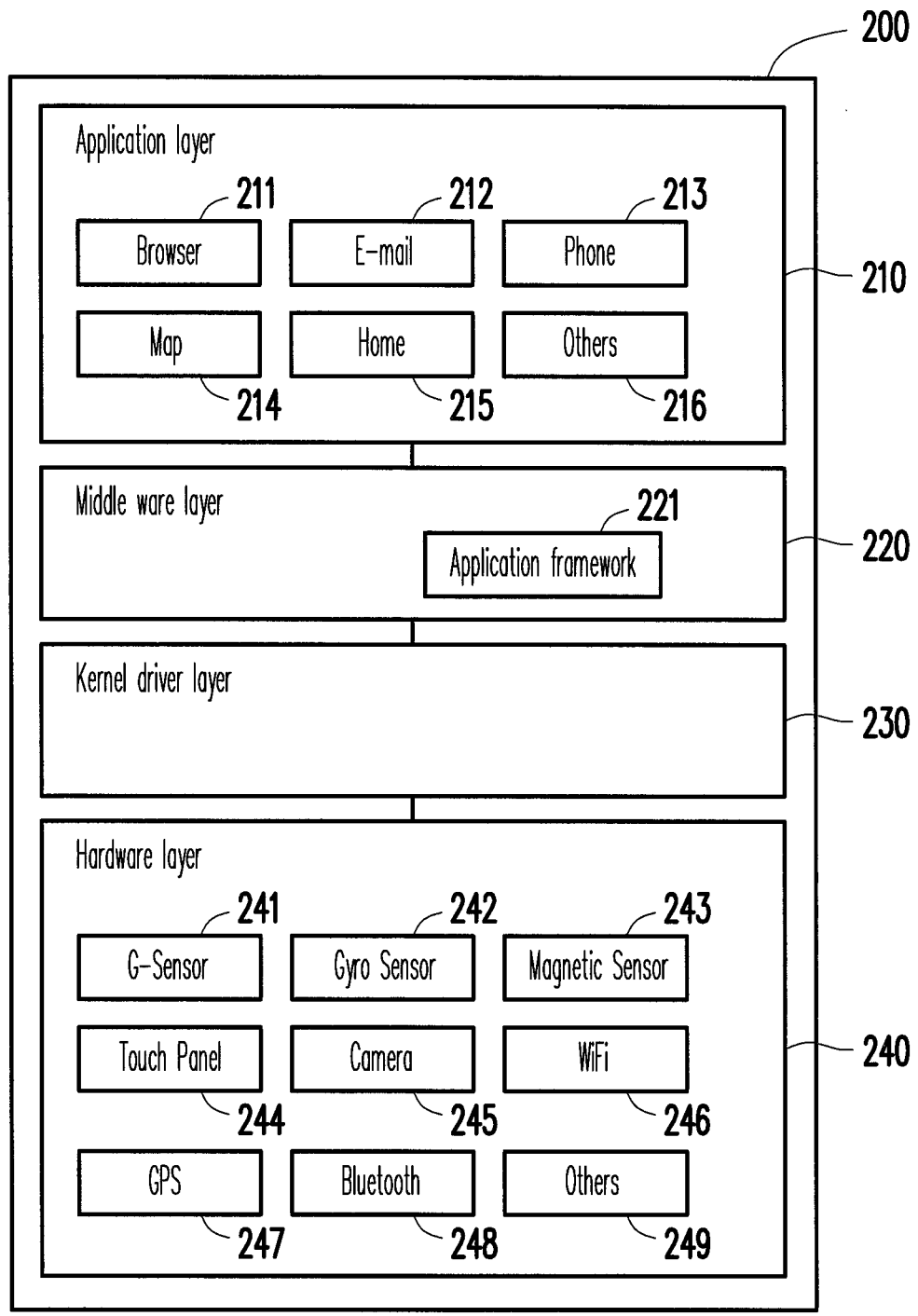
FIG. 2 is a schematic diagram illustrating a structure of a handheld device according to one embodiment of the present invention.

FIG. 2 is a schematic diagram illustrating a structure of a handheld device according to one embodiment of the present invention. Referring to FIG. 2, the handheld device 200 comprises an application layer 210, a middle ware layer 220, a kernel driver layer 230 and a hardware layer 240. The application layer 210 comprises various applications in the upmost layer such as a browser 211, an E-mail application 212, a phone application 213, a map application 214, a home application 215, and other applications 216. All the information obtained through the application programming interface (API) is provided to the applications. The middle ware layer 220 defines an application framework 221 for the developers to use all software and hardware. The kernel driver layer 230 may drive the devices in the hardware layer 240 and retrieve data of the devices through a bus such as I2C bus. The hardware layer 240 may comprise one or a combination of a G-sensor 241, a Gyro sensor 242, a magnetic sensor 243, a touch panel 244, a camera 245, a Wi-Fi transceiver 246, a GPS 247, a Bluetooth 248 and other hardware 249, which is not limited herein.

Figure 3:
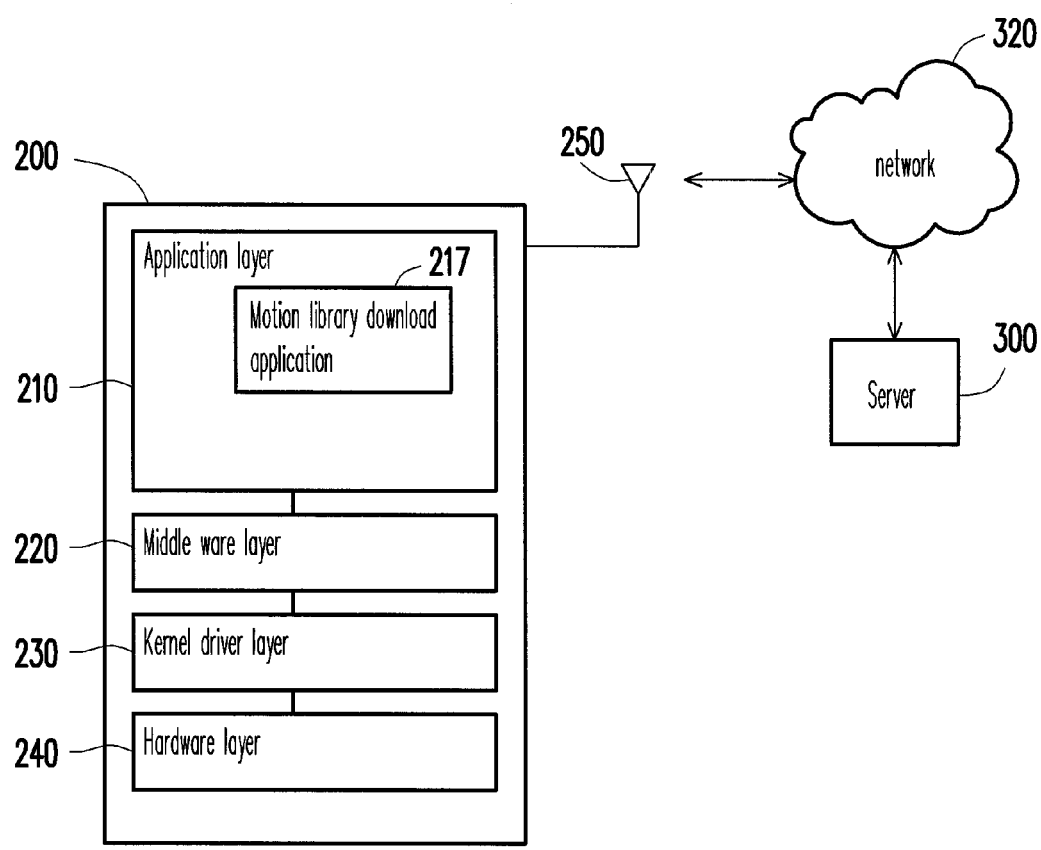
FIG. 3 is a schematic diagram of a system for providing a motion library according to one embodiment of the present invention.

FIG. 3 is a schematic diagram of a system for providing a motion library according to one embodiment of the present invention. Referring to FIG. 3, the system of the present embodiment comprises the handheld device 200 of FIG. 2 and a server 300. The application layer 210 of the handheld device 200 further comprises a motion library downloading application 217 for executing motion library downloading. The handheld device 200 may connect with the server 300 through the network 320 such as Internet, local area network (LAN), wide area network (WAN), or Ethernet by using wired or wireless interface 250, so as to download the motion library from the server 300.

Figure 4:
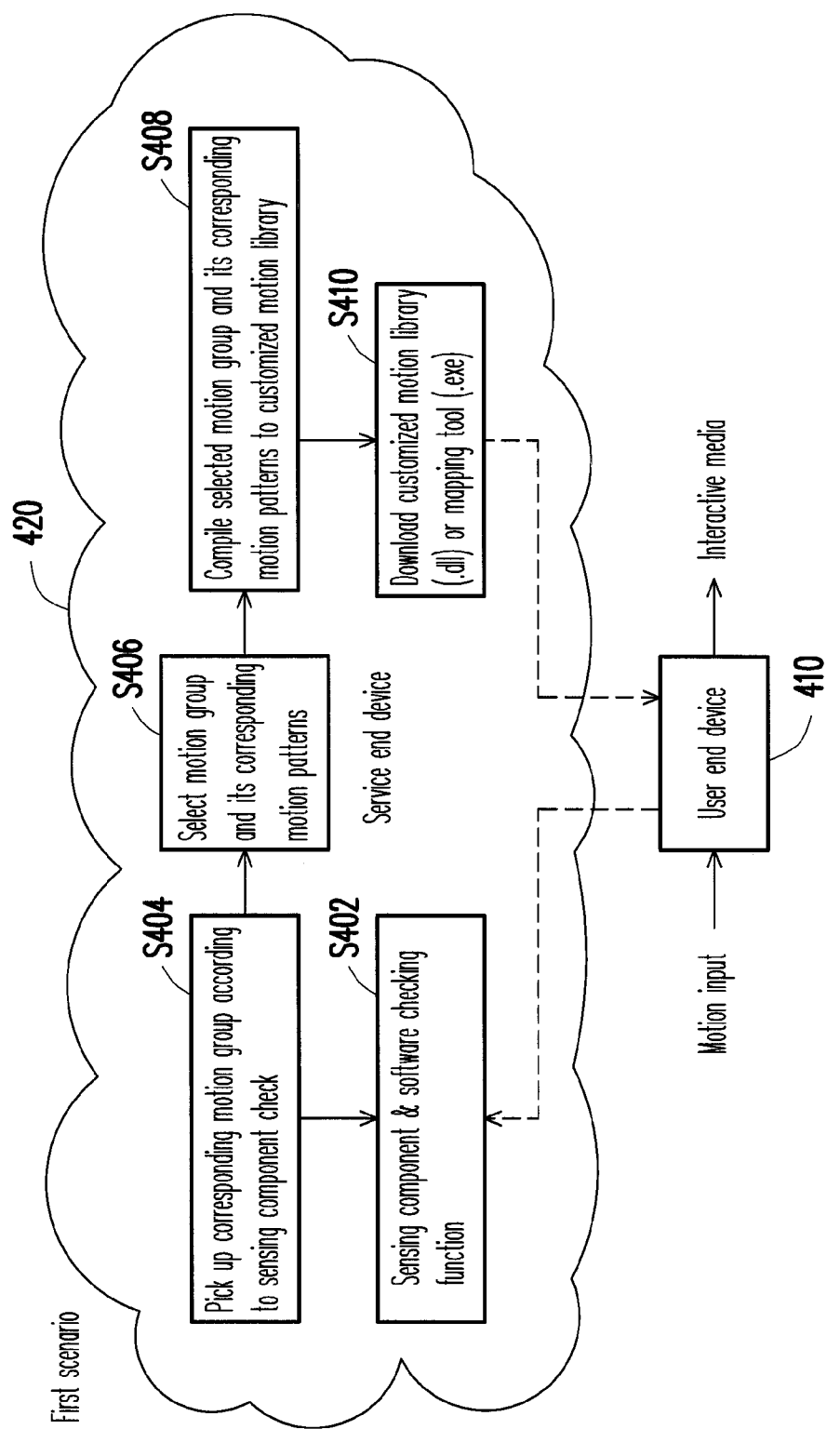
FIG. 4 is a schematic diagram illustrating a method of a first scenario for providing a motion library according to one embodiment of the present invention.

FIG. 4 is a schematic diagram illustrating a method of a first scenario for providing a motion library according to one embodiment of the present invention. Referring to FIG. 4, the first scenario of the present invention is to re-compile a motion library corresponding to the motion patterns selected by a user in the service end device 420 and provide the re-compiled motion library to the user end device 410, so as to enable the user end device 410 to recognize the selected motion patterns.

In detail, when the user end device 410 connects with the service end device 420 through network, the service end device 420 may execute a function of checking sensing component and software and accordingly transmit a checking command to the user end device 410 (step S402). Accordingly, the user end device 410 returns sensor data of the sensing components disposed therein. Then, the service end device 420 picks up the motion groups comprising motion patterns that can be recognized by the sensing components according to the result of sensing component check (step S404). The service end device 420 receives a selecting instruction from the user so as to select the motion group and its corresponding motion patterns (step S406) and accordingly compiles the selected motion group and its corresponding motion patterns to a customized motion library (step S408). Finally, the user end device 410 downloads the customized motion library or a mapping tool with the customized motion library loaded therein to install (step S410). Accordingly, when the user end device 410 receives a motion input from the user, it may recognize the motion pattern corresponding to the motion input according to the customized motion library and transmits the input operation to the interactive media (e.g. game, UI, etc.) so as to perform the input operation.

Figure 5:
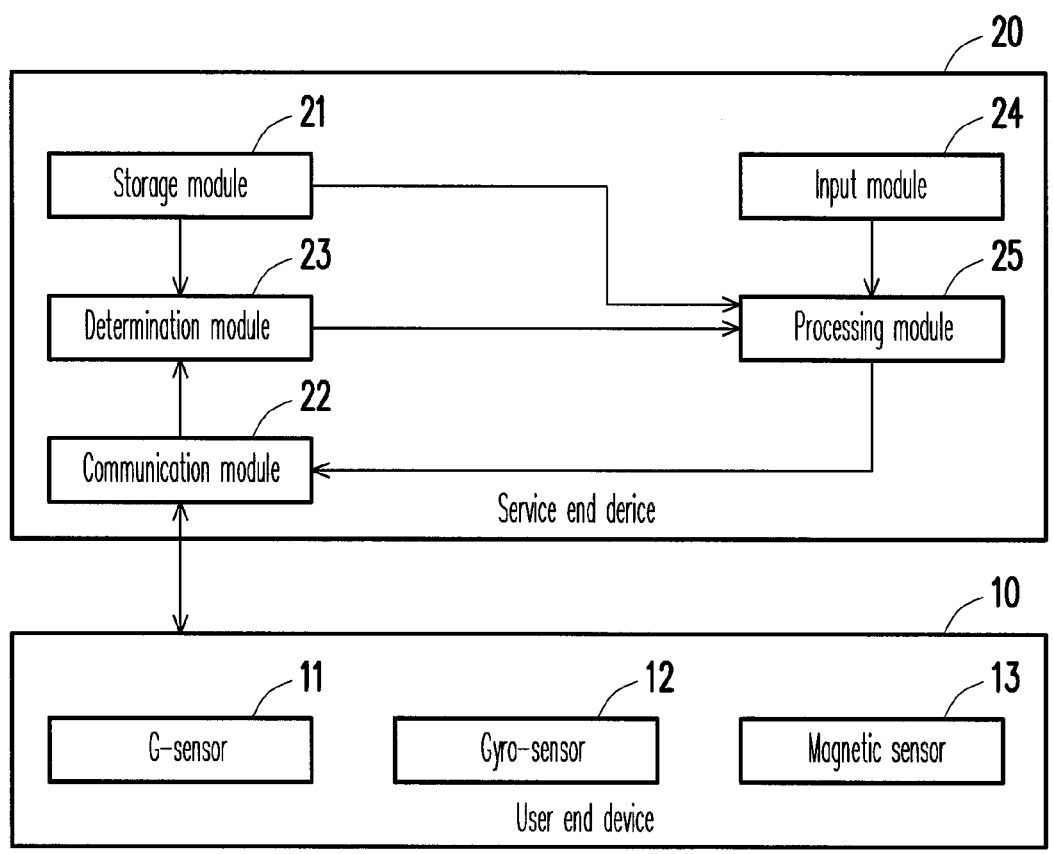
FIG. 5 is a diagram of a system for providing a motion library according to one embodiment of the present invention.

FIG. 5 is a diagram of a system for providing a motion library according to one embodiment of the present invention. Referring to FIG. 5, the system of the present embodiment comprises a user end device 10 and a service end device 20. The user end device 10 is, for example, a portable electronic device having a G-sensor 11, a gyro sensor 12, a magnetic sensor 13, or other sensing components such as a touch pad (not shown) or a camera (not shown). The service end device 20 is, for example, a cloud server disposed remotely and used for providing services such as cloud computing, data management, storage, and networking. The user end device 10 is, for example, connected to the service end device 20 via internet or intranet.

The service end device 20 comprises a storage module 21, a communication module 22, a determination module 23, an input module 24, and a processing module 25. The storage module 21 is, for example, a flash memory, a hard disk, or other similar storage devices, and is used for storing a motion database, which records at least one motion library required for recognizing the motion patterns. The communication module 22 is, for example, a wired or a wireless network-connecting module that is configured to connect with the user end device 10. The determination module 23 is configured to determine the sensing components (i.e. G-sensor 11, gyro sensor 12 and magnetic sensor 13) disposed on the user end device 10 and to determine at least one motion group according to the determined sensing components, wherein each motion group comprises at least one motion pattern. The input module 24 is, for example, a keyboard, a mouse, or a touch pad, and is configured to receive a selecting operation of one or a plurality of the at least one motion pattern. The processing module 25 is configured to query the motion database so as to determine at least one motion pattern recognizable by the sensing components and obtain the at least one motion library required for recognizing the motion patterns.

In detail, the processing module 25 is, for example, configured to query the motion database stored in the storage module 21 to display a list of the motion groups corresponding to the selected motion patterns, select the motion groups from the list, select the motion patterns belonging to the corresponding motion groups to re-compile a customized motion library, and provide the customized motion library for the user end device, so as to enable the user end device to recognize the selected motion patterns.

The aforesaid determination module 23 and processing module 25 are, for example, computer programs comprising a plurality of instructions to be executed by a central processing unit (CPU), programmable microprocessor, digital signal processor (DSP), programmable controller, application specific integrated circuit (ASIC), or other similar devices disposed in the service end device 20, which is not limited in the present embodiment.

Figure 6:
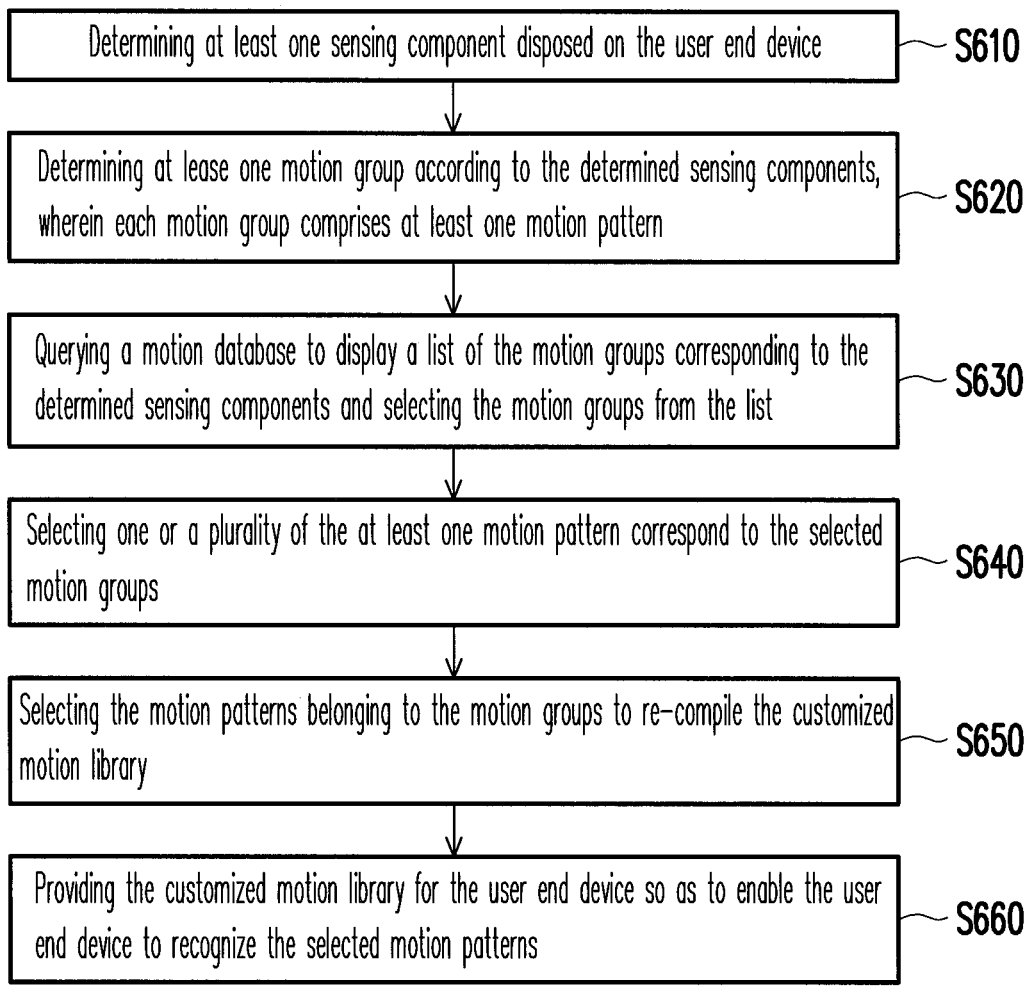
FIG. 6 is a flowchart illustrating a method for providing a motion library according to one embodiment of the present invention.

In detail, FIG. 6 is a flowchart illustrating a method for providing a motion library according to one embodiment of the present invention. Referring to both FIG. 5 and FIG. 6, the service end device 20 re-compiles a customized motion library according to the motion patterns selected by a user and accordingly provides a customized motion library for the user end device 10 to install. As a result, whenever a user performs one of the pre-selected motion patterns on the user end device 10, the type of motion pattern is recognized and an operation corresponding to the recognized motion pattern is executed. Detailed steps of the motion library providing method of the present embodiment are described below with reference to aforesaid elements of system 200.

First, the determination module 23 determines at least one sensing component disposed on the user end device 10 (step S610). In one embodiment, when the user end device 10 connects with the service end device 20 and requests for a motion library, the determination module 23 of the service end device 20 automatically detects the sensing components disposed on the user end device 10 by sending a plurality of checking commands to the user end device 10 and receiving the sensor data returned by the user end device 10, and accordingly determines the types of the sensing components. In another embodiment, the determination module 23 may receive a selecting instruction of the user from the user end device 10 and accordingly determine the types of the sensing components.

Next, the determination module 23 determines at lease one motion group according to the determined sensing components (step S620), wherein each motion group comprises at least one motion pattern. In detail, the determination module 23 may query the motion database stored in the storage module 21 to find the motion groups containing the motion patterns that can be recognized by the detection of the sensing components configured in the user end device 10.

Then, the processing module 25 queries the motion database stored in the storage module 21 to display a list of the motion groups corresponding to the determined sensing components and selects the motion groups from the list (step S630).

Next, the input module 24 receives an operation for selecting one or a plurality of the at least one motion pattern corresponding to the selected motion groups from the user (step S630), so as to select the motion patterns to be recognized.

In an embodiment, the service end device 20 may further comprise a motion database creating module (not shown), which is configured to previously measure a plurality of parameters generated when the sensing components recognize each of the at least one motion pattern, and record the parameters in the motion database as the motion library corresponding to the motion pattern, so as to create the motion database.

Then, the processing module 25 selects the motion patterns belonging to the corresponding motion group to re-compile a customized motion library (step S650). Wherein, the processing module 25 may obtain the motion libraries required for recognizing the motion patterns, and re-compile the customized motion library based on the obtained motion libraries. The customized motion library is re-compiled by, for example, training a motion model through a recognition algorithm.

Figure 7:
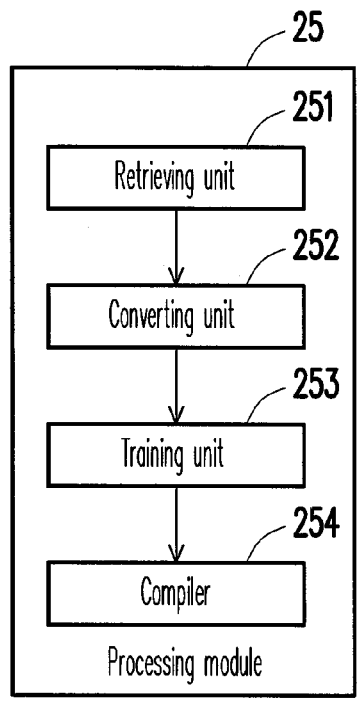
FIG. 7 is a block diagram of a processing module for re-compiling the customized motion library according to one embodiment of the present invention.
Figure 8:
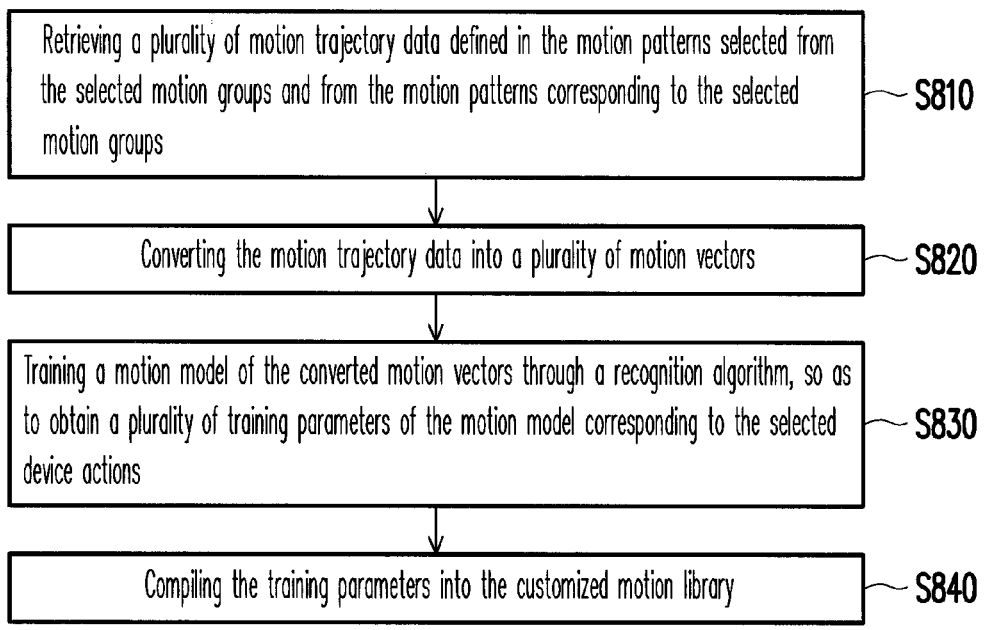
FIG. 8 is a flowchart illustrating a method for re-compiling the customized motion library according to one embodiment of the present invention.

In detail, FIG. 7 is a block diagram of a processing module for re-compiling the customized motion library according to one embodiment of the present invention and FIG. 8 is a flowchart illustrating a method for re-compiling the customized motion library according to one embodiment of the present invention. Referring to both FIG. 7 and FIG. 8, the processing module 25 of the present embodiment is further divided into a retrieving unit 251, a converting unit 252, a training unit 253 and a compiler 254. Detailed steps of the re-compiling method of the present embodiment are described below with reference to aforesaid elements of processing module 25.

First, the retrieving unit 251 retrieves a plurality of motion trajectory data defined in the motion patterns selected from the selected motion groups and from the motion patterns corresponding to the selected motion groups (step S810), and then the converting unit 252 converts the motion trajectory data into a plurality of motion vectors (step S820). Next, the training unit 253 trains a motion model of the converted motion vectors through a recognition algorithm, so as to obtain a plurality of training parameters of the motion model corresponding to the selected motion patterns (step S830). Finally, the compiler 254 inputs the training parameters into a recognition system and compiles the training parameters into the customized motion library (step S840). The customized motion library defines a plurality of sets of training parameters, including strengths and rotations of the motion detected by the motion sensors that are corresponding to the selected motion patterns and used for recognition algorithms.

Figure 9:
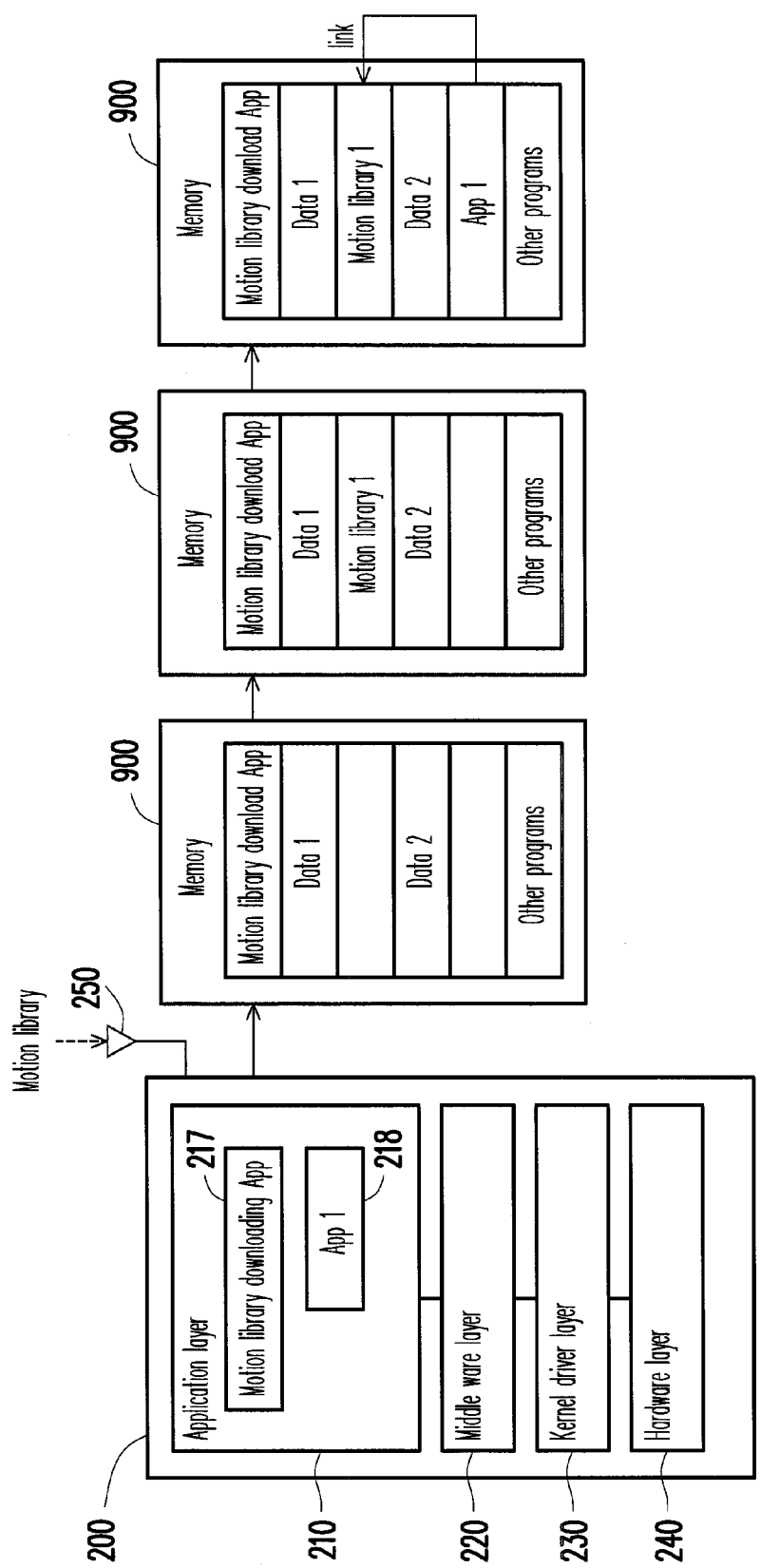
FIG. 9 is a schematic diagram illustrating a memory management for customized motion library according to one embodiment of the present invention.

FIG. 9 is a schematic diagram illustrating a memory management for customized motion library according to one embodiment of the present invention. Referring to FIG. 9, when the user end device downloads a motion library from a service end device, the motion library is transmitted to a memory 900 of the user end device, in which the memory 900 originally stores a motion library download application, Data 1, Data 2, and some other programs. The motion library is then stored in one of the available memory blocks. An application Appl that applies the motion library is stored in another memory block of the memory 900 and is linked to the motion library, so as to apply the motion library for motion recognition.

It is noted herein that the filename extension of the motion library downloaded to the user end device may vary in accordance with the header file (e.g. Function 1, Function 2, Function 3, etc.) of the application, the operating system (e.g. Windows, Android, Linux, etc.) and the CPU architecture (e.g. x86, ARM, etc.) of the user end device. After the service end device executes the function of checking sensing component and software, it re-compiles corresponding motion library with filename extension such as ".dll", ".jar", ".so", etc, and sends the corresponding header files to the user end device if necessary.

It is noted herein that the motion library described above may be loaded to a mapping tool, which is then downloaded to the user end device, so as to enable the user end device to perform motion recognition. To be specific, the service end device may provide the mapping tool for the user end device, so as to map the motion pattern recognized by the user end device to an input operation of an input device of the user end device. Accordingly, the user end device may perform the input operation of the input device.

Figure 10:
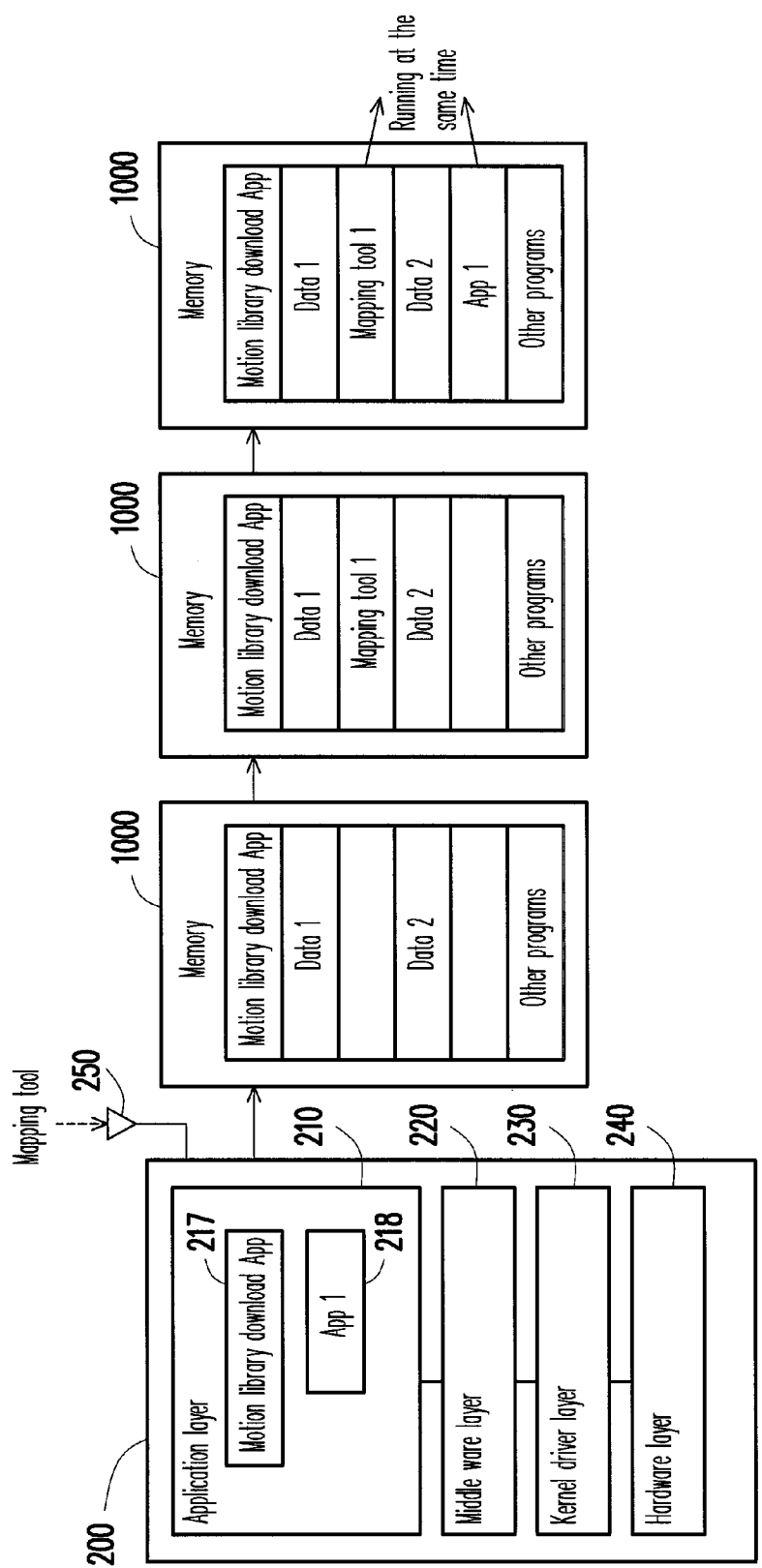
FIG. 10 is a schematic diagram illustrating a memory management for customized motion library according to one embodiment of the present invention.

FIG. 10 is a schematic diagram illustrating a memory management for customized motion library according to one embodiment of the present invention. Referring to FIG. 10, first, a motion library used for motion recognition is loaded to a mapping tool by a service end device. The mapping tool is then downloaded from the service end device to a user end device and transmitted to a memory 1000 of the user end device, in which the memory 1000 originally stores a motion library download application, Data 1, Data 2, and some other programs. The mapping tool is then stored in one of the available memory blocks. An application Appl that applies the motion library is stored in another memory block of the memory 1000 and is run along with the mapping tool, so as to apply the motion library for motion recognition. The down-loaded mapping tool may be used to convert the result of motion recognition into input operation of the input device of the user end device.

Figure 11:
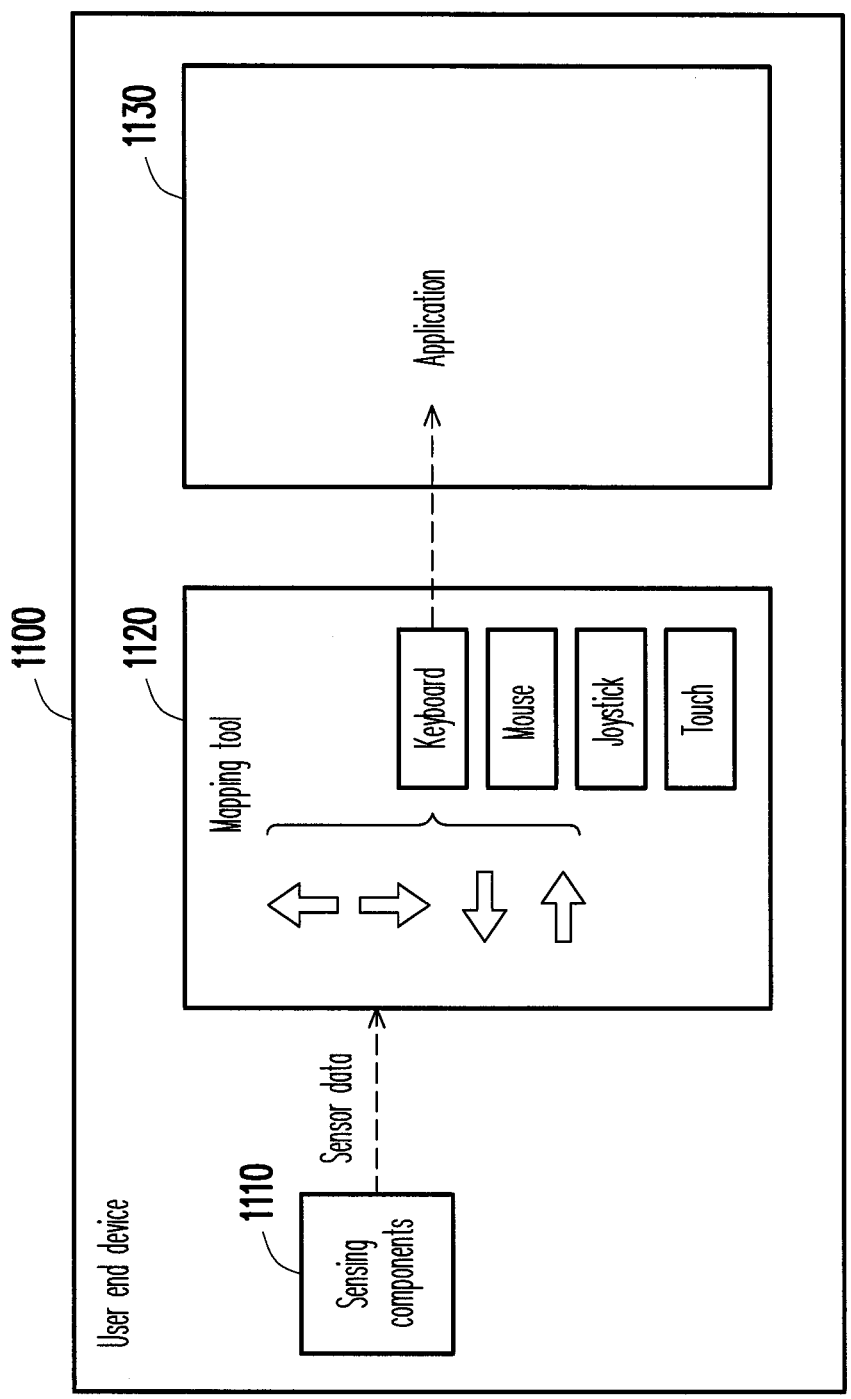
FIG. 11 is a schematic diagram illustrating a method for converting the result of motion recognition into an input operation of an input device according to one embodiment of the present invention.

FIG. 11 is a schematic diagram illustrating a method for converting the result of motion recognition into an input operation of an input device according to one embodiment of the present invention. Referring to FIG. 11, the mapping tool 1120 downloaded from the service end device and the application 1130 originally installed in the user end device 1100 are simultaneously run by the user end device 1100, such that when a user performs one of a plurality of motion patterns on the user end device 1100, sensor data generated by the sensing components 1110 of the used end device 1100 is input to the mapping tool 1120 installed in the user end device 1100. Then, the sensor data is recognized by the user end device 1100 by using the motion library loaded in the mapping tool 1120 and converted into an input operation of an input device, such as a flag of a numeral output or an output of a keyboard, a mouse, a joystick, or a touch panel signal. The converted input operation is sent to the application 1130, so as to execute a corresponding function defined by the application 1130.

Figure 12:
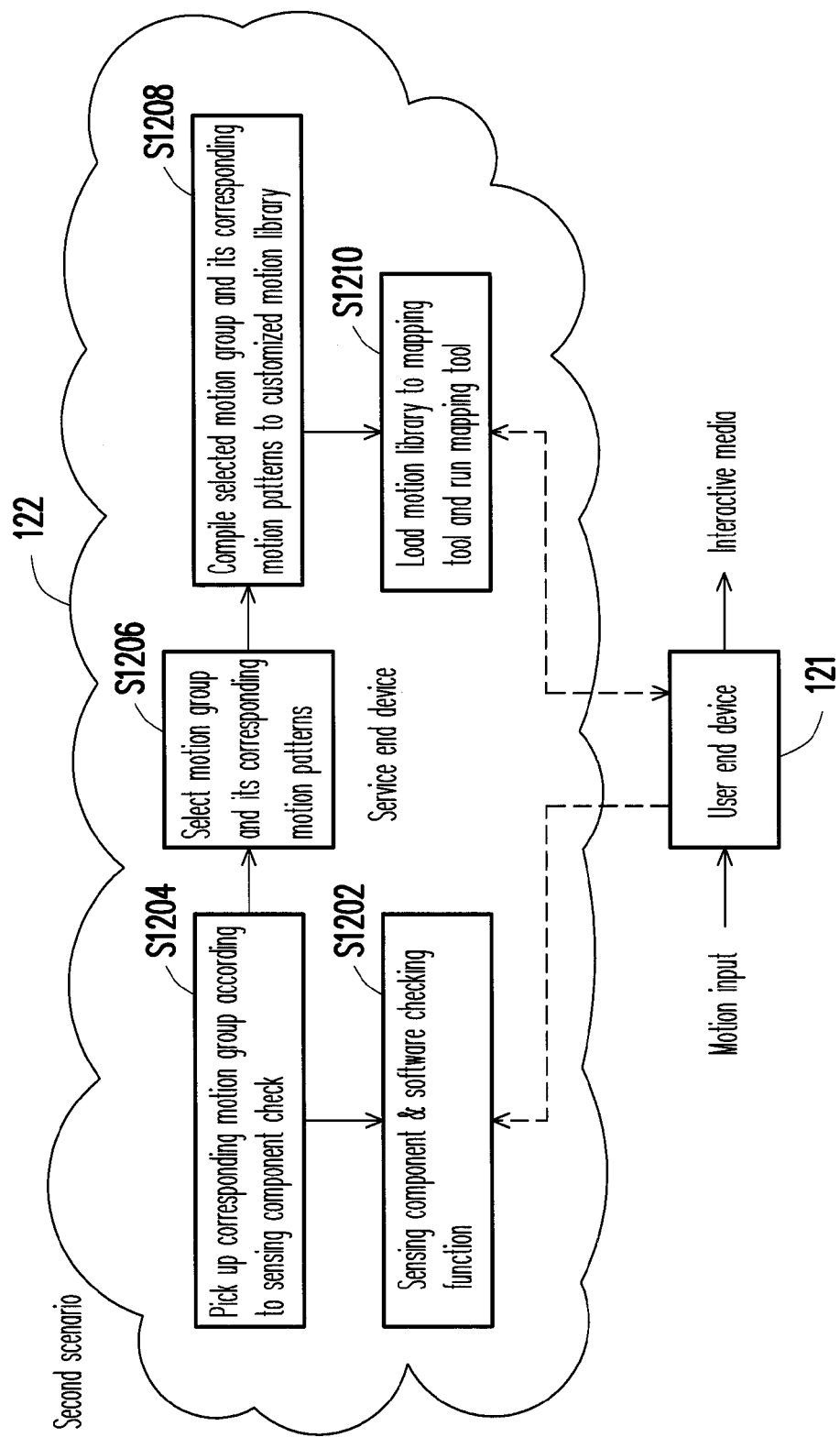
FIG. 12 is a schematic diagram illustrating a method of a second scenario for providing a motion library according to one embodiment of the present invention.

FIG. 12 is a schematic diagram illustrating a method of a second scenario for providing a motion library according to one embodiment of the present invention. Referring to FIG. 12, the second scenario of the present invention is to re-compile a motion library corresponding to the motion patterns selected by a user in the service end device 122, run the re-compiled motion library on the service end device 122 and provide a recognition result for the user end device 121, so as to enable the user end device 121 to recognize the selected motion patterns.

In detail, when the user end device 121 connects with the service end device 122 through network, the service end device 122 may execute a function of checking sensing component and software and accordingly transmit a checking command to the user end device 121 (step S1202). Accordingly, the user end device 121 returns sensor data of the sensing components disposed therein. Then, the service end device 122 picks up the motion groups comprising motion patterns that can be recognized by the sensing components according to the result of sensing component check (step S 1204). The service end device 122 receives a selecting instruction from the user so as to select the motion group and its corresponding motion patterns (step S1206) and accordingly compiles the selected motion groups and its corresponding motion patterns to a customized motion library (step S1208). Then, the user end device 121 loads the customized motion library to a mapping tool and runs the mapping tool (step S1210).

Accordingly, when the user end device 121 receives a motion input from the user, it transmits the motion input to the service end device 122 and then the service end device 122 maps the recognized motion pattern of the user end device to an input operation of an input device of the user end device by using the mapping tool and transmits the input operation of the input device to the user end device 121. Finally, the user end device 121 transmits the input operation to the interactive media so as to perform the input operation.

In detail, the service end device 20 re-compiles a customized motion library according to the motion patterns selected by a user and accordingly executes the customized motion library. As a result, whenever a user performs one of the pre-selected motion patterns on the user end device 10, the movement of the user end device 10 is detected by each of the at least one sensing component of the user end device and interpreted by the service end device 20 by using the customized motion library, so as to recognize the motion pattern performed on the user end device 10.

Figure 13:
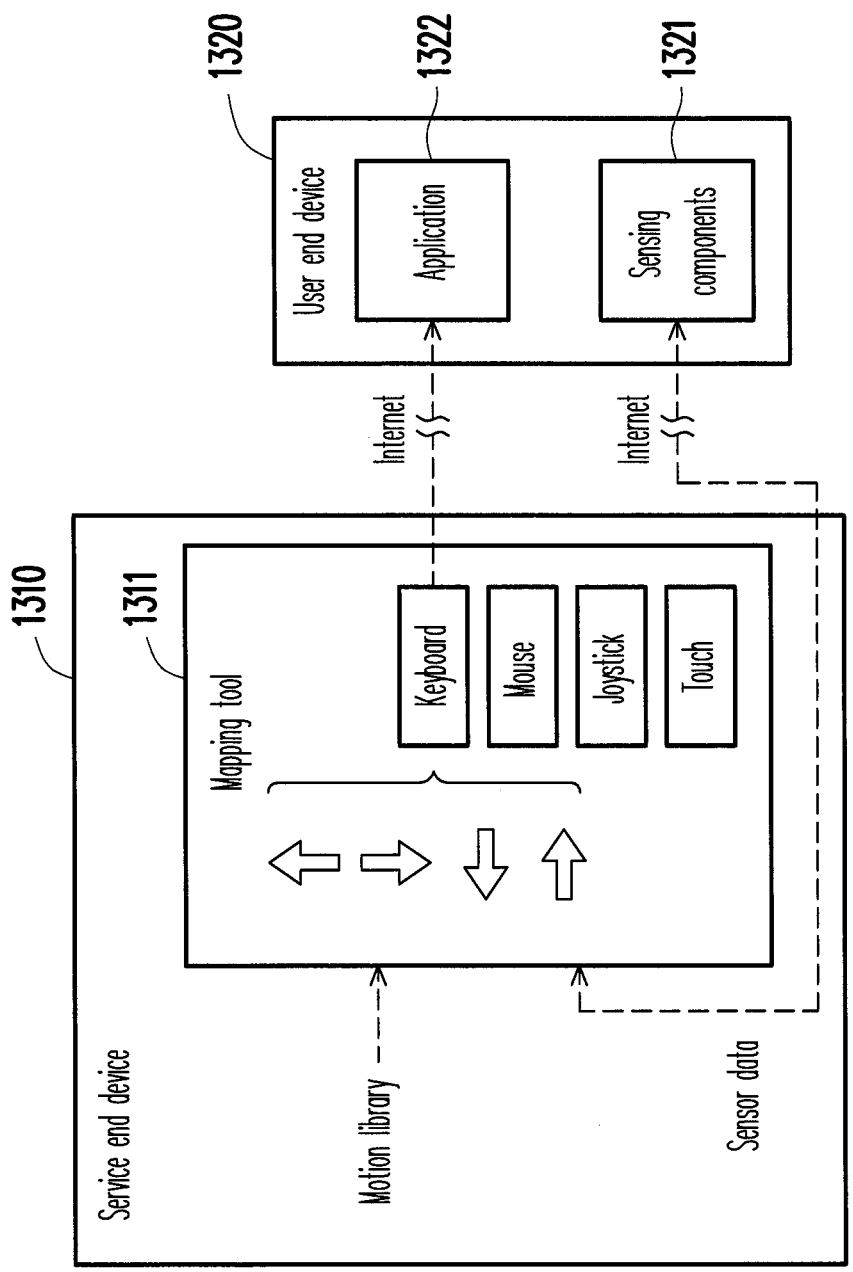
FIG. 13 is a schematic diagram illustrating a method for converting the result of motion recognition into an input operation of an input device according to one embodiment of the present invention.

FIG. 13 is a schematic diagram illustrating a method for converting the result of motion recognition into an input operation of an input device according to one embodiment of the present invention. Referring to FIG. 13, the mapping tool 1311 generated by the service end device 131 is run by the service end device 1310 while an application 1322 is run by the user end device 1320, such that when a user performs one of a plurality of motion patterns on the user end device 1320, sensor data generated by the sensing components 1321 of the used end device 1320 is transmitted to the service end device 1310 and recognized by the service end device 1310 by using the customized motion library loaded in the mapping tool 1311. The recognition result is then converted into input operation of an input device, such as a flag of a numeral output or an output of a keyboard, a mouse, a joystick, or a touch panel. The converted input operation is sent to the user end device 1320 and input to the application 1322, so as to execute a corresponding function defined by the application 1322.

To sum up, through the downloading of motion library provided in the method of the first scenario, game developers may re-download their own application. After statistically re-loading (re-compiling) or dynamically re-loading (without re-compiling) the application, the function of motion recognition can be obtained without the need to additionally develop algorithms for motion recognition, which is convenient for the game developers. In addition, the motion library originally installed in the mobile phone may be updated with the motion library of latest version through aforesaid method.

Further, through the downloading of mapping tool provided in the method of the first scenario, an ordinary user may obtain a motion recognition result to correspond to the input of existing devices such as keyboard, mouse, joystick, or touch panel, so as to interact with existing games. The user may directly apply the mapping tool to any other input device for motion recognition and mapping.

On the other hand, through the on-line mapping tool provided in the method of the second scenario, the motion performed by the user on the user end device can be converted into corresponding signals of keyboard, mouse, joystick, or touch panel, so as to provide the user with ease to interact with existing games. Through the on-line mapping tool, there is no need to download mapping tool with different versions for all games, which saves the storage cost. Further, since the database for motion recognition and comparison are stored in the service end device, the storage cost is also reduced.

Further, the on-line mapping tool provided in the method of the second scenario may only transmit a calculation result to the user end device without transformation of the mapping tool. Accordingly, the developers of the user end device may use the calculation result for other applications, which is useful for the content developers.

Figure 14A:
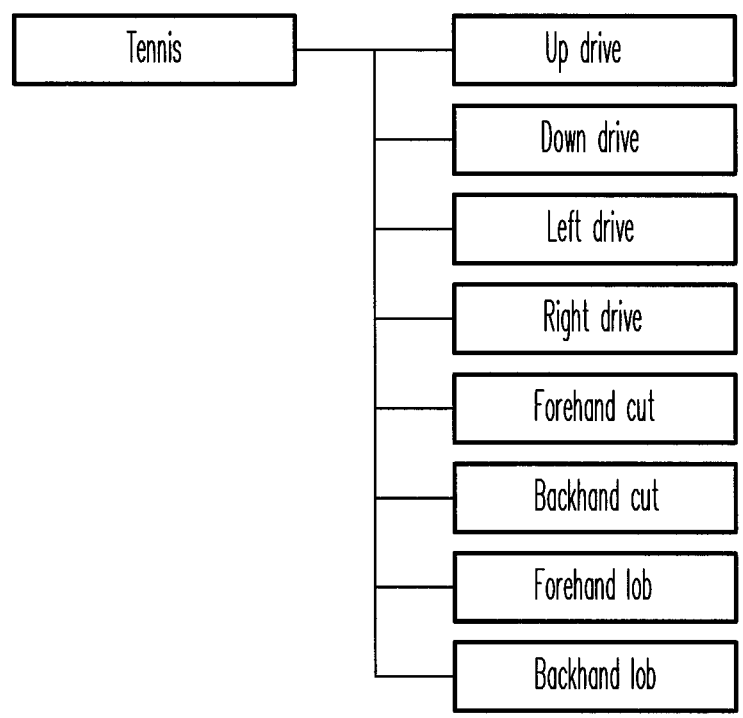
FIG. 14A and FIG. 14B illustrate an example of re-compiling a customized motion library according to one embodiment of the present invention.
Figure 14B:
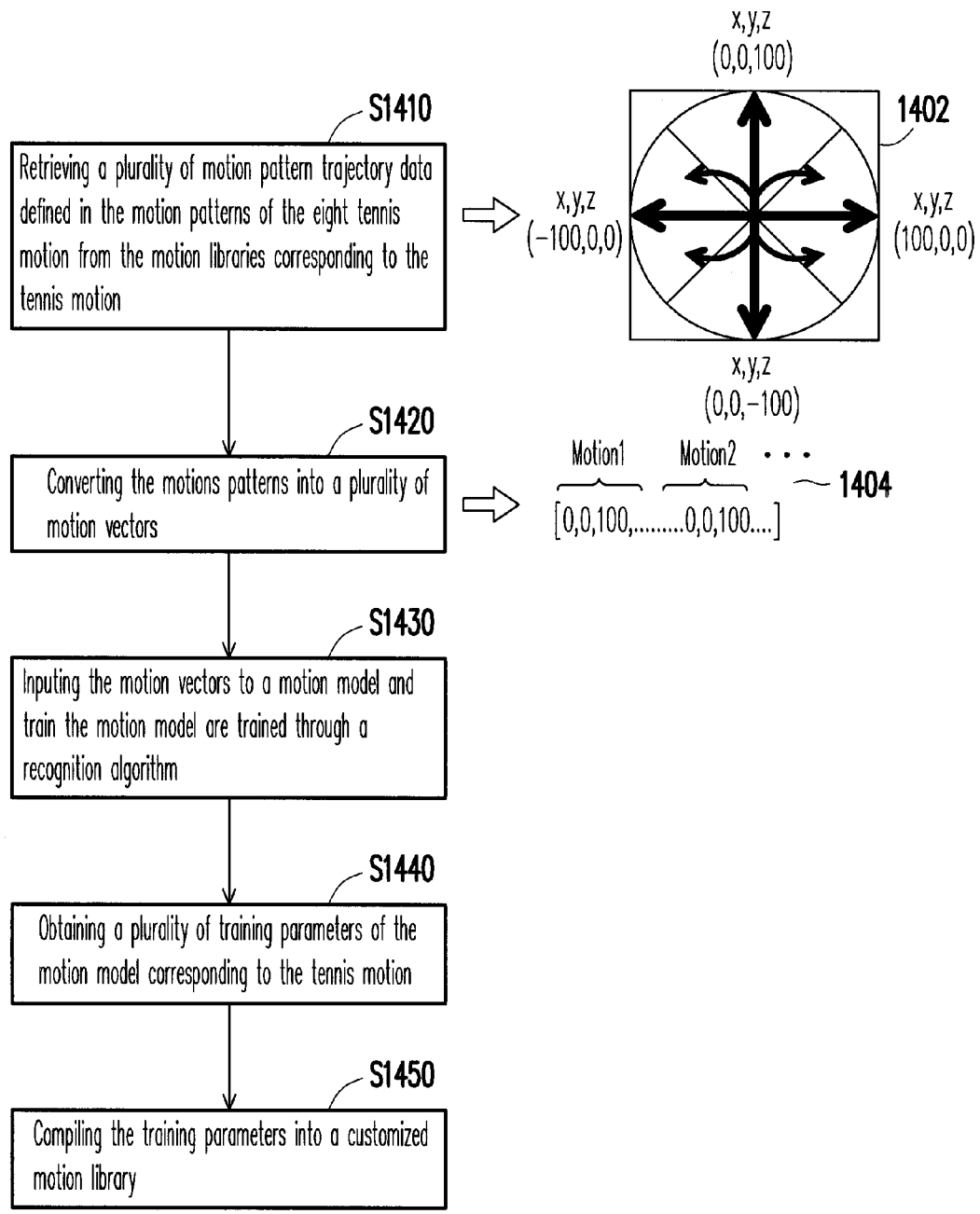

In an example of the first scenario, FIG. 14A and FIG. 14B illustrate an example of re-compiling a customized motion library according to one embodiment of the present invention. The present embodiment assumes the device motion selected by a user are tennis motion under a motion group of tennis. Referring to FIG. 14A, the motion group of tennis comprises eight tennis motion, namely, up drive, down drive, left drive, right drive, forehand cut, backhand cut, forehand lob, and backhand lob. Then, referring to FIG. 14B, in the re-compiling process of motion library, a plurality of motion pattern trajectory data defined in the motion patterns of the eight tennis motion (shown in coordinate diagram 1402) are retrieved from the motion libraries corresponding to the tennis motion (step S1410). Then, the motions patterns are converted into a plurality of motion vectors 1404 (step S1420). The motion vectors 1404 are input to a motion model and the motion model are trained through a recognition algorithm (step S1430), so as to obtain a plurality of training parameters of the motion model corresponding to the tennis motion (step S1440). Finally, the training parameters are compiled into a customized motion library (step S1450).

To install the customized motion library in the user end device, the customized motion library may be either directly sent to the user end device 10 by the service end device 20 or indirectly sent to the user end device 10 by an intermediary device disposed between the service end device 20 and the user end device 10. The intermediary device may be a computer in the client end, and the user may use the computer to download the customized motion library and then install the customized motion library in the user end device 10 through the computer. After the customized motion library is installed in the user end device 10, each of the selected motion patterns performed on the user end device 10 can be recognized through the comparison of the parameters of motion sensors.

Figure 15:
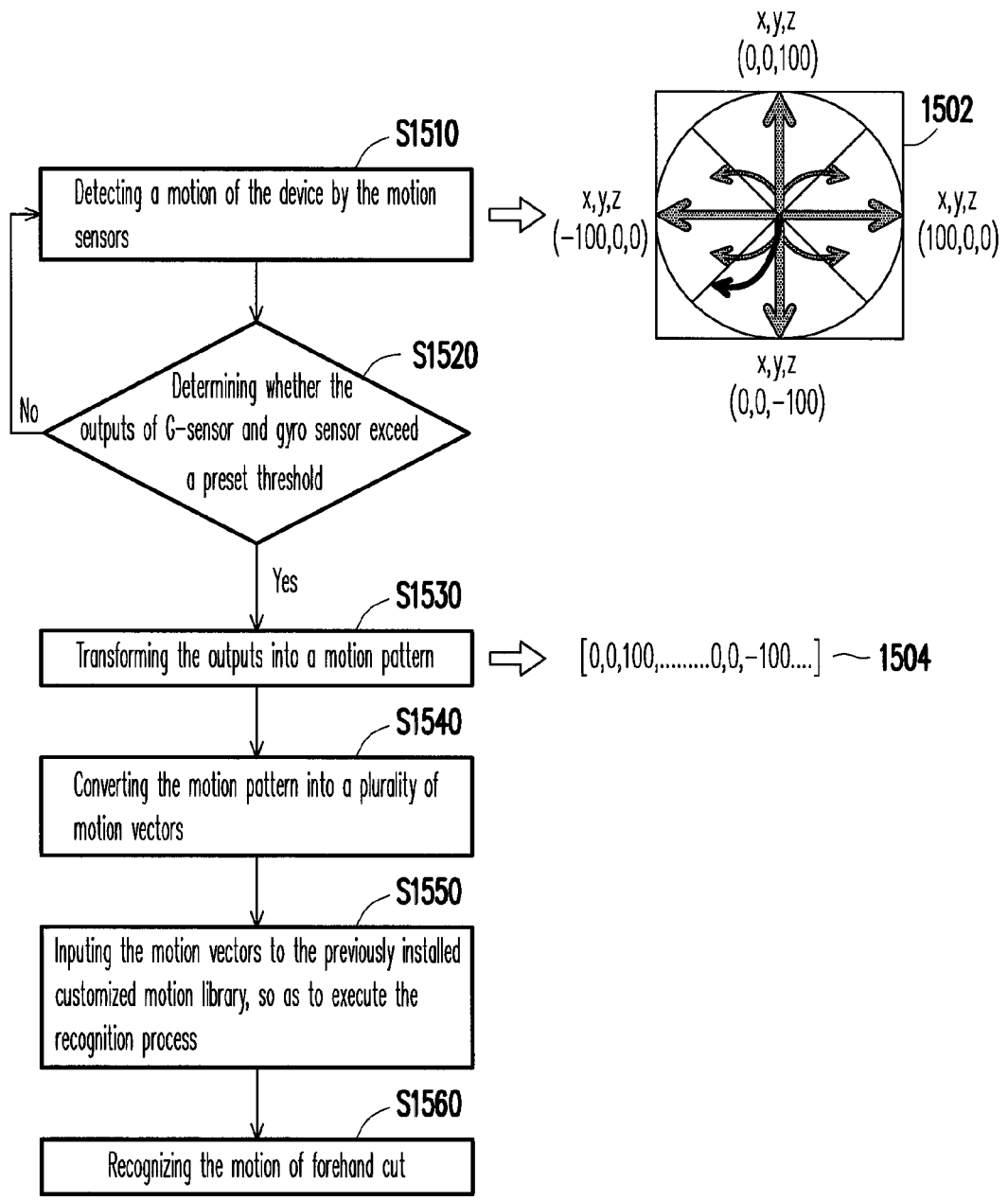
FIG. 15 illustrates an example of recognizing a motion pattern according to one embodiment of the present invention.

For example, FIG. 15 illustrates an example of recognizing a motion pattern according to one embodiment of the present invention. Referring to FIG. 15, after the customized motion library is installed in the user end device, when a user performs a motion of forehand cut on the device, a movement of the device is detected by the motion sensors (step S1510). Meanwhile, the user end device 10 determines whether the outputs of G-sensor and gyro sensor exceed a preset threshold and accordingly determines whether to activate the recognition (step S1520). If the outputs exceed the preset threshold, the user end device transforms the outputs into a motion pattern (as the black arrow shown in coordinate diagram 1502) (step S1530), and converts the motion pattern into a plurality of motion vectors 1504 (step S1540). The motion vectors 1504 are input to the previously installed customized motion library, so as to execute the recognition process (step S1550).

It is noted herein that, in the recognition process, a strength and a rotation of the motion are respectively calculated according to the detected outputs and are input into the customized motion library for recognition, in which the strength is an accumulation of acceleration variations within a period of time in 3D space and the rotation is an accumulation of angular velocity variations within a period of time in 3D space. Finally, the motion of forehand cut is recognized (step S1560).

It is noted herein that when the user selects the motion patterns to be used, he/she may respectively apply each of the selected motion patterns to a device operation of the user end device. Accordingly, when the motion pattern performed by the user is recognized, the user end device may further execute a device operation corresponding to the motion pattern. In detail, the user end device may detect a motion thereof by using the sensing components and accordingly generating outputs. Then, the user end device interprets the outputs by using the installed customized motion library, so as to recognize the motion pattern performed thereon. Finally, the user end device executes the device operation corresponding to the motion pattern.

To perform the recognition process remotely, the customized motion library is stored in the service end device, such that the recognition of the motion patterns performed on the user end device can be realized through on-line calculation by the service end device. In detail, when a user performs a motion pattern on the user end device, a plurality of outputs are generated by the sensing components and are sent to the service end device. Accordingly, the service end device interprets the outputs obtained by each of the sensing components to recognize the motion pattern performed on the user end device. Finally, the recognition result is sent back to the user end device, so as to enable the user end device to recognize the motion pattern.

Figure 16:
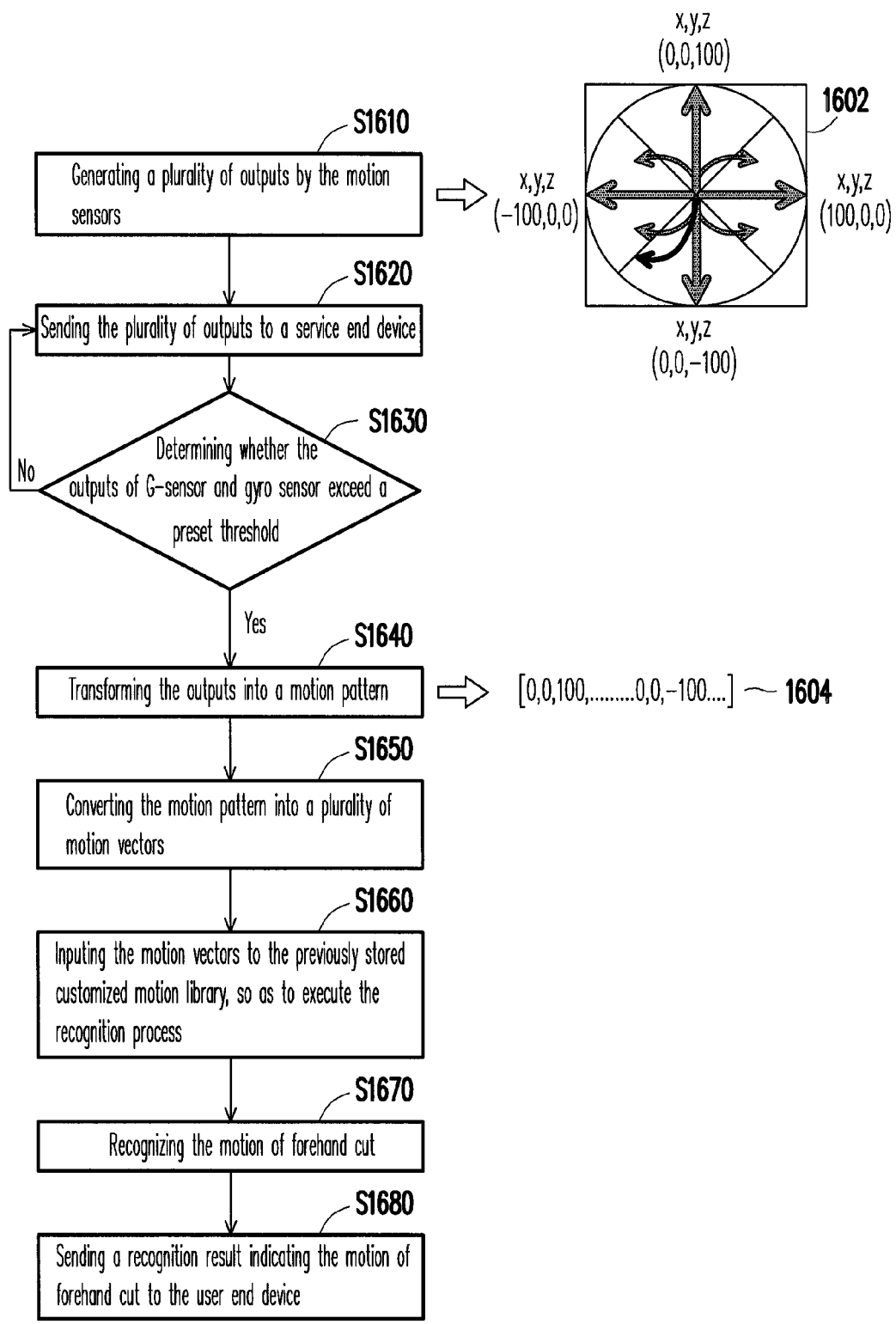
FIG. 16 illustrates an example of recognizing a motion pattern according to one embodiment of the present invention.

For example, FIG. 16 illustrates an example of recognizing a motion pattern according to one embodiment of the present invention. Referring to FIG. 16, after the customized motion library is stored in the service end device, when a user performs a motion of forehand cut on the device, a plurality of outputs are generated by the motion sensors (step S1610) and sent to the service end device (step S1620). Then, the service end device determines whether the outputs of G-sensor and gyro sensor exceed a preset threshold and accordingly determines whether to activate the recognition process (step S1630). If the outputs exceed the preset threshold, the user end device transforms the outputs into a motion pattern (the black arrow shown in coordinate diagram 1602) (step S1640), and converts the motion pattern into a plurality of motion vectors 1604 (step S1650). The service end device further inputs the motion vectors 1604 to the previously stored customized motion library to execute the recognition process (step S1660). Finally, a recognition result of the forehand cut is obtained (step S1670) and sent back to the user end device, so as to enable the user end device to recognize the motion of forehand cut (step S1680).

Similarly, when the user selects the motion patterns to be used, he/she may respectively apply the selected motion patterns to a device operation of the user end device. Accordingly, when the motion pattern performed by the user is recognized, the user end device may further execute a device operation corresponding to the motion pattern.

It is noted herein that, in the present embodiment, all the motion patterns are classified into a plurality of motion groups and motion types, each of the motion groups may contain one or a plurality of motion types or motion patterns, and each of the motion types may contain one or a plurality of motion patterns. A motion menu comprising all of the motion groups may be displayed for the user to select the desired motion patterns. It is noted herein that, in the present embodiment, the device motion are classified into three layers including motion group, motion type and motion pattern, but is not limited thereto. Persons skilled in the art may classify the device motion in two or more layers so as to help the user to precisely select the motion patterns to be recognized.

Figure 17:
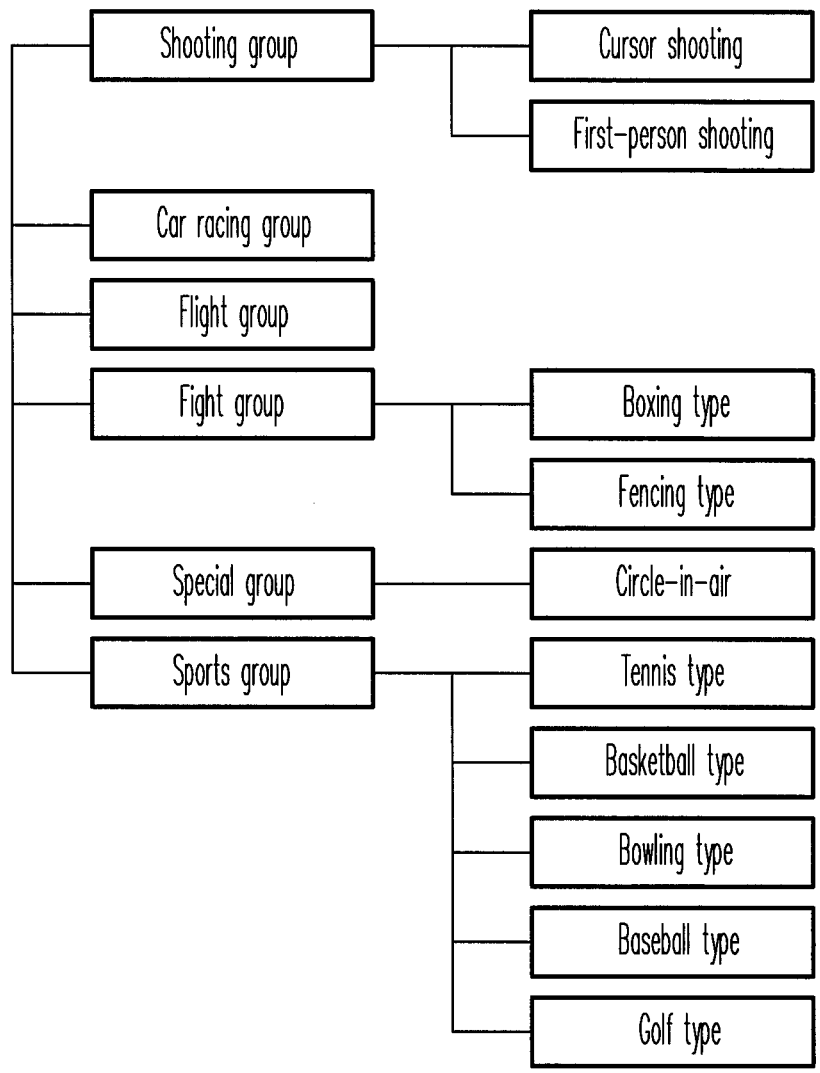
FIG. 17 is an example of a motion menu according to one embodiment of the present invention.

For example, FIG. 17 is an example of a motion menu according to one embodiment of the present invention. The present embodiment is adapted to the system for providing a motion library as described in the previous embodiment. Referring to FIG. 5 and FIG. 17, the service end device 20 classifies the motion patterns in the motion database into a shooting group, a car racing group, a flight group, a fight group, a sports group and a special group. Each motion group may contain one or more motion types and each motion type further contains one or more motion patterns. For example, the sports group contains tennis type, basketball type, bowling ball type, baseball type and golf type, in which the tennis type further contains eight motion patterns including up drive, down drive, left drive, right drive, forehand cut, backhand cut, forehand lob, and backhand lob.

Based on aforesaid classification, a user may select one or a plurality of motion patterns under different motion groups or different motion types and accordingly the service end device 20 re-compiles a customized motion library based on the motion libraries in accordance with the selected motion patterns under the corresponding motion groups or motion types.

Figure 18A:
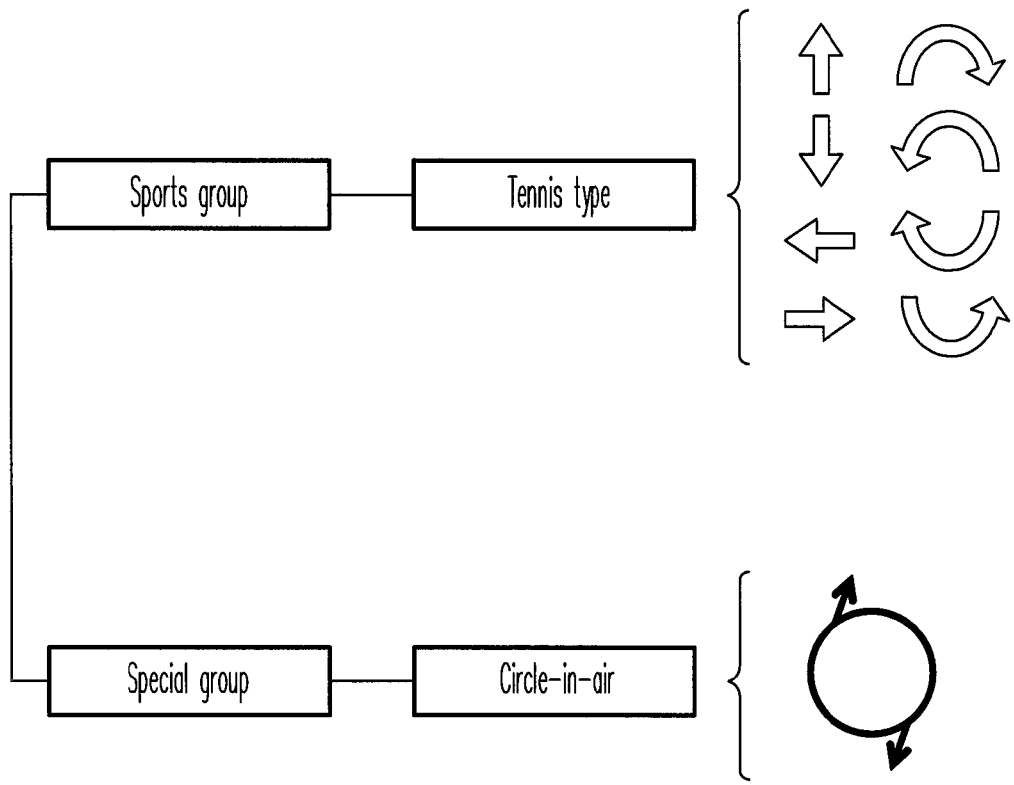
FIG. 18A and FIG. 18B illustrate an example of re-compiling a customized motion library according to one embodiment of the present invention.
Figure 18B:
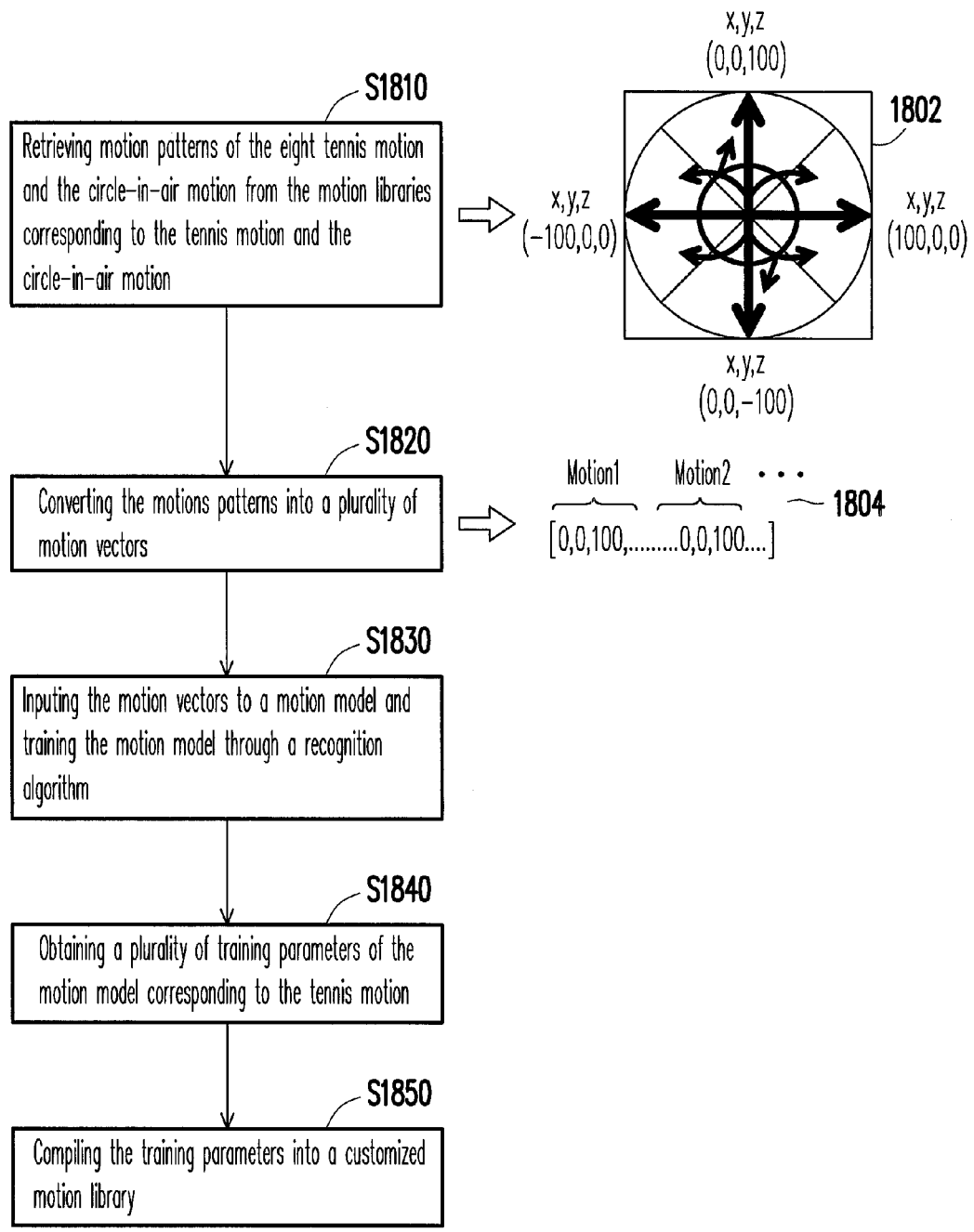

For example, FIG. 18A and FIG. 18B illustrate an example of re-compiling a customized motion library according to one embodiment of the present invention. The present embodiment is adapted to the processing module 25 of the service end device 20 as described in the previous embodiment, in which it is assumed the motion patterns selected by a user are eight tennis motion under a tennis type of a sports group plus a circle-in-air motion under a special group (as shown in FIG. 18A). Referring to FIG. 7 and FIG. 18B, in the re-compiling process, the retrieving unit 251 retrieves motion patterns of the eight tennis motion and the circle-in-air motion, as shown in the coordinate diagram 1802, from the motion libraries corresponding to the tennis motion and the circle-in-air motion (step S1810). Then, the converting unit 252 converts the motions patterns into a plurality of motion vectors 1804 (step S1820). Then, the training unit 253 inputs the motion vectors 1804 to a motion model and trains the motion model through a recognition algorithm (step S1830), so as to obtain a plurality of training parameters of the motion model corresponding to the tennis motion (step S1840). Finally, the compiler 254 compiles the training parameters into a customized motion library (step S1850).

Figure 19:
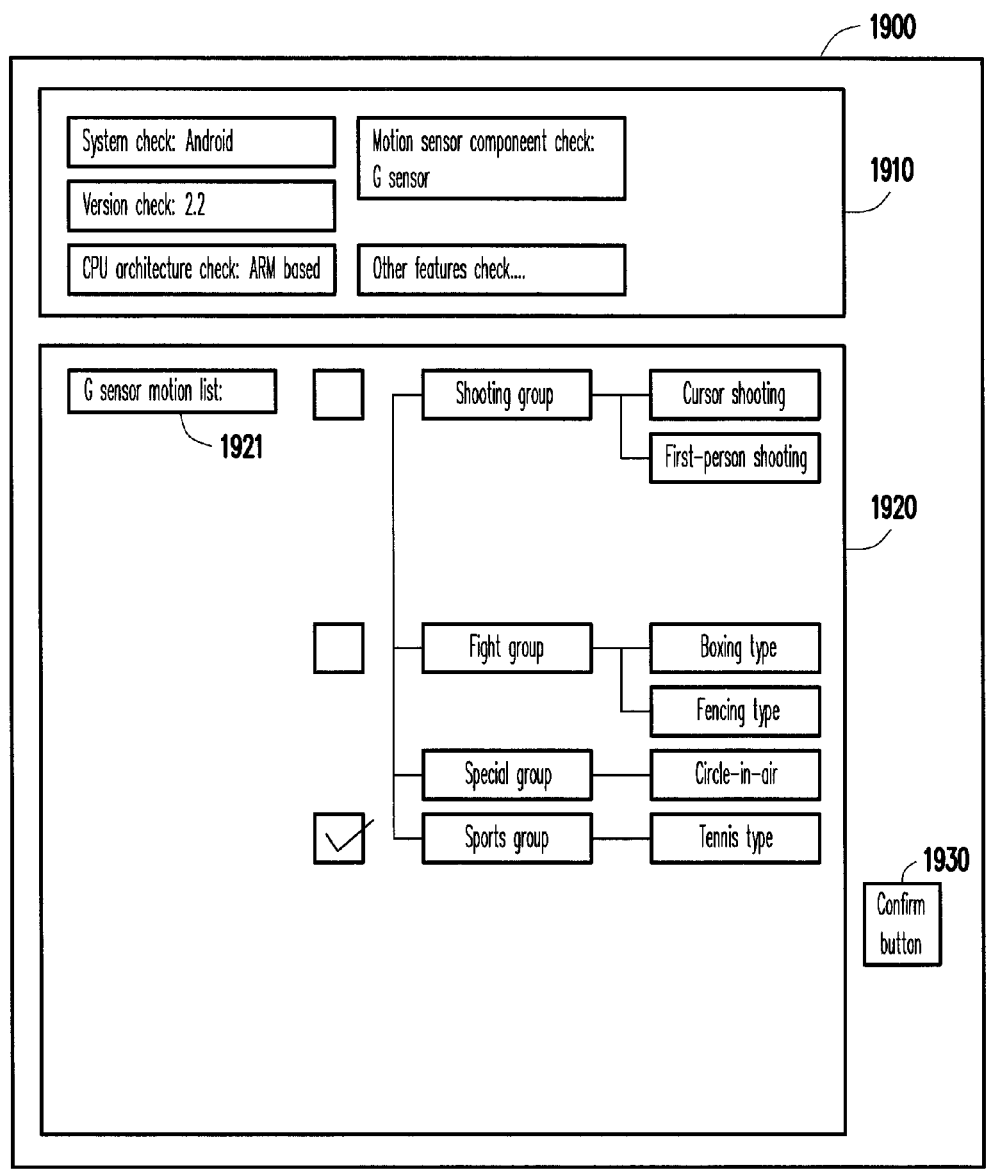
FIG. 19 to FIG. 24 illustrate an example of a user interface (UI) for generating and providing a customized motion library according to one embodiment of the present invention.

FIG. 19 to FIG. 24 illustrate an example of a user interface (UI) for generating and providing a customized motion library according to one embodiment of the present invention. Referring to FIG. 19, the user interface 1900 is displayed after system component checking and comprises a system information area 1910, a motion pattern check area 1920, and a confirm button 1930. To be specific, after the system architecture of the user end device is detected and analyzed, system information including operating system (OS) type, OS version, CPU architecture, and motion sensor type is displayed in the system information area 1910. The system information may be automatically detected by the user end device or manually entered by a user of the user end device, which is not limited herein.

Referring to FIG. 19, if only a G sensor is detected, the motion groups and motion types that can be identified by the G sensor are queried from the motion database and listed in the motion pattern check area 1920, so as to be selected by the user. The G sensor motion list 1921 comprises shooting group, fight group, special group and sports group, in which the shooting group further comprises motion types including a cursor shooting type and a first-person shooting type, and the fight group further comprises motion types including boxing type and fencing type. A check box is further displayed in front of each motion group such that the user can select favorite motion groups used for device operation.

Figure 20:
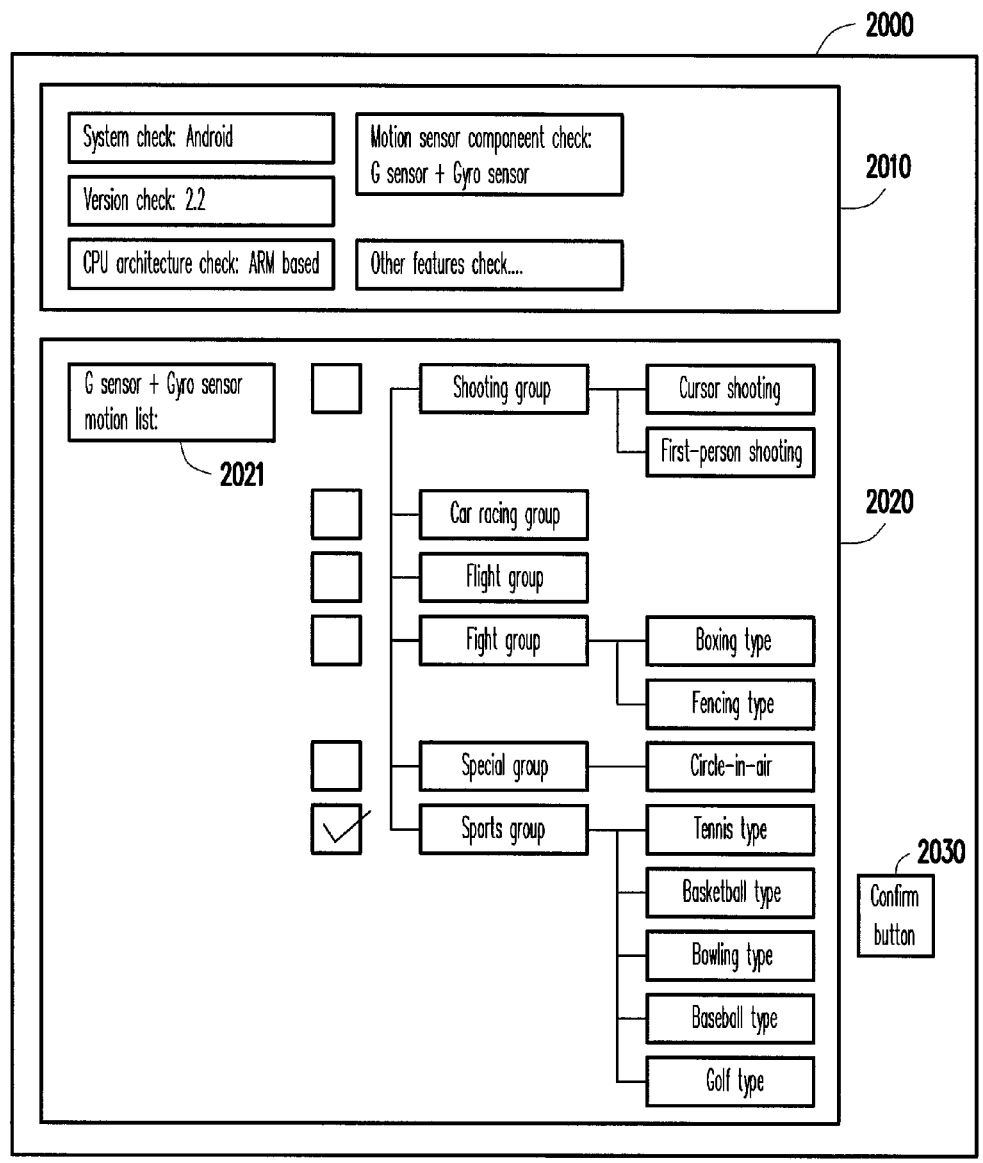

Referring to FIG. 20, if a G sensor and a Gyro sensor are detected, a G sensor plus Gyro sensor motion list 2021 is displayed in the motion pattern check area 2020, so as to be selected by the user. The G sensor plus Gyro sensor motion list 2021 comprises shooting group, car racing group, flight group, fight group, special group and sports group, in which the shooting group comprises cursor shooting type and first-person shooting type, the fight group comprises boxing type and fencing type, and the sports group comprises tennis type, basketball type, bowling type, baseball type and golf type. A check box is further displayed in front of each motion group such that the user can select favorite motion groups used for device operation. It is noted herein that, compared to the G sensor motion list 2021 of FIG. 20, since a Gyro sensor is further used, the motion groups or motion types that are listed in the G sensor plus Gyro sensor motion list 2021 are also increased.

Figure 21:
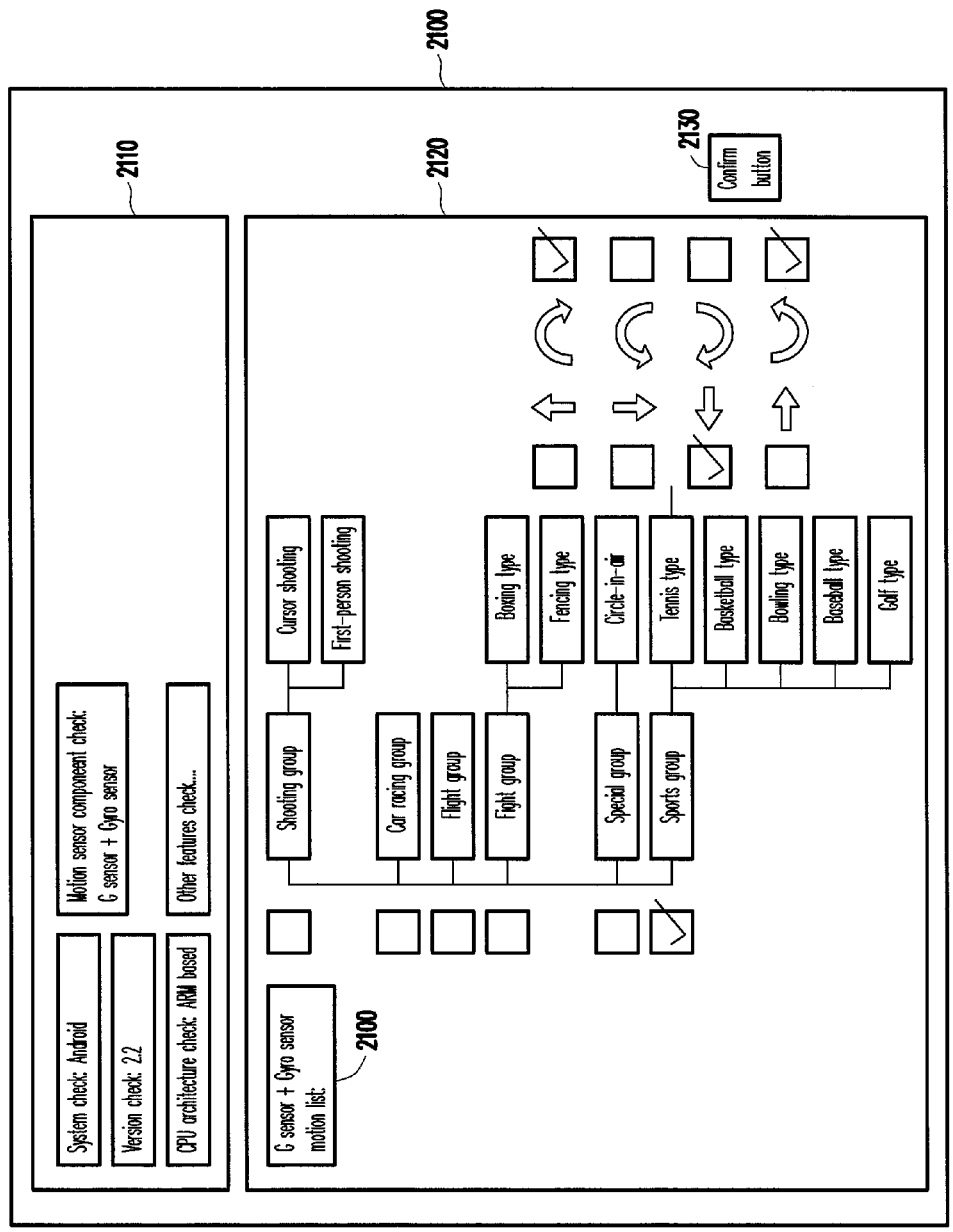

Referring to FIG. 21, a G sensor and a Gyro sensor are also detected, and a G sensor plus Gyro sensor motion list 2100 is displayed in the motion pattern check area 2120, so as to be selected by the user. Besides the motion groups and motion types, the G sensor plus Gyro sensor motion list 2100 further displays eight different kinds of motion patterns under the tennis type whenever the user selects the item of tennis type. Check boxes are further displayed aside the motion patterns such that the user can select favorite motion patterns used for device operation. It is noted herein that, the UI for providing the motion library of the present embodiment comprises three layers for selection, that are, motion group, motion type and motion pattern, in which the user may select desired motion patterns under the same or different motion types or motion groups for compiling the motion library. However, the number of layers to be displayed and selected is not limited herein, the list may contain two layers or any number of layers greater than two layers.

Figure 22:
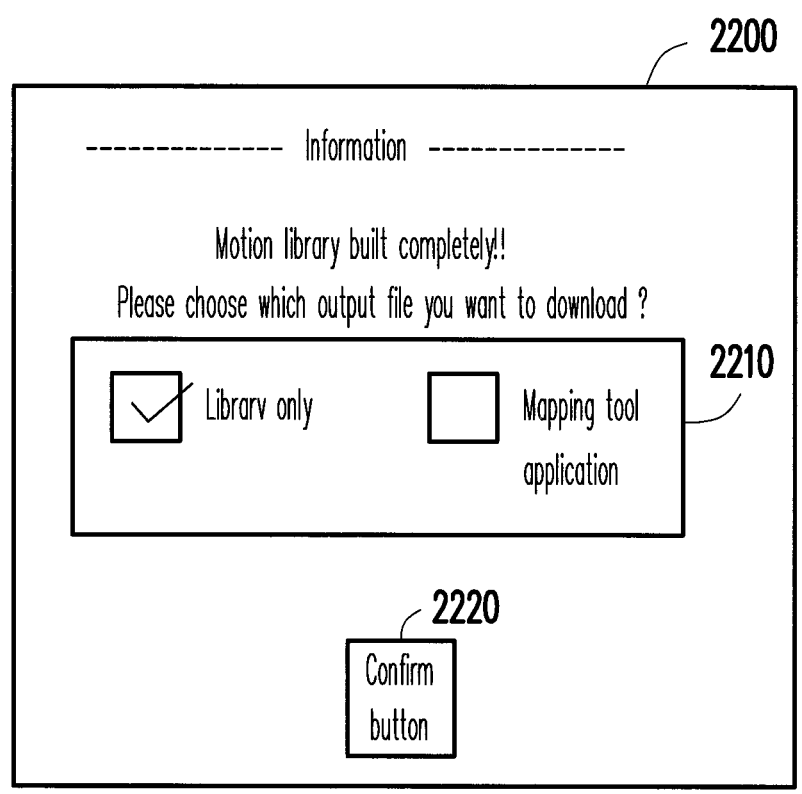

Referring to FIG. 22, after the user selects the motion groups, motion types and motion patterns to be used and presses the confirm button, a motion library corresponding to the selected motion groups, motion types and motion patterns is built and a dialog 2210 for selecting the output of the motion library is displayed in the user interface 2200, in which the dialog comprises an option of library only and an option of mapping tool. If the user selected the option of library only, corresponding motion libraries with filename extension like ".so", ".jar" or ".etc" are downloaded from the service end device to the user end device.

Figure 23:
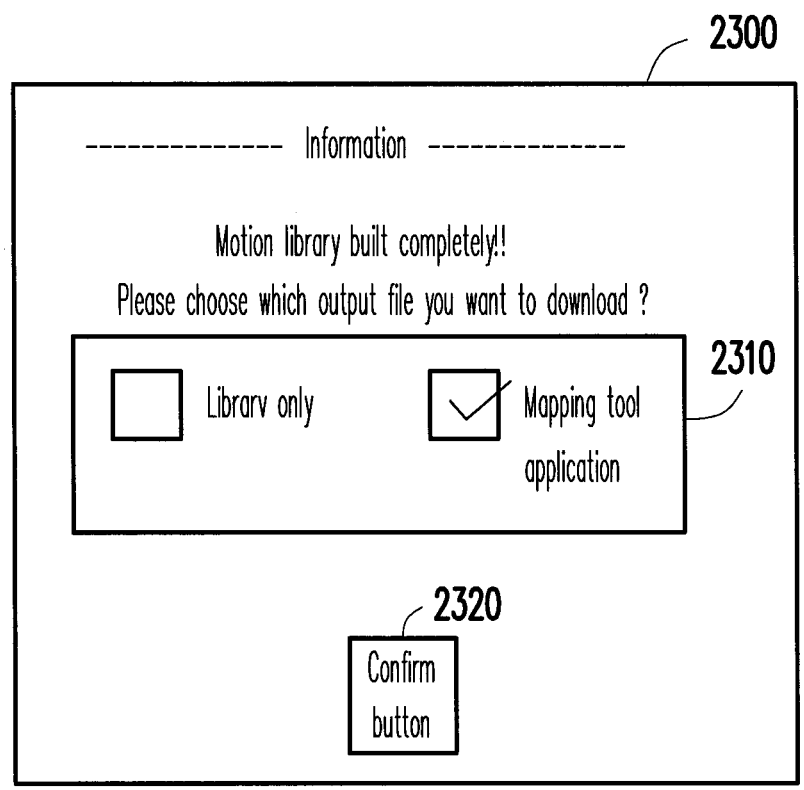

On the other hand, referring to FIG. 23, a dialog 2310 for selecting the output of the motion library is displayed in the user interface 2300. If the user selected the option of mapping tool application, the motion library having filename extension such as ".so", ".jar" or ".etc" is loaded to a mapping tool and a procedure for setting the mapping tool transformation is processed.

Figure 24:
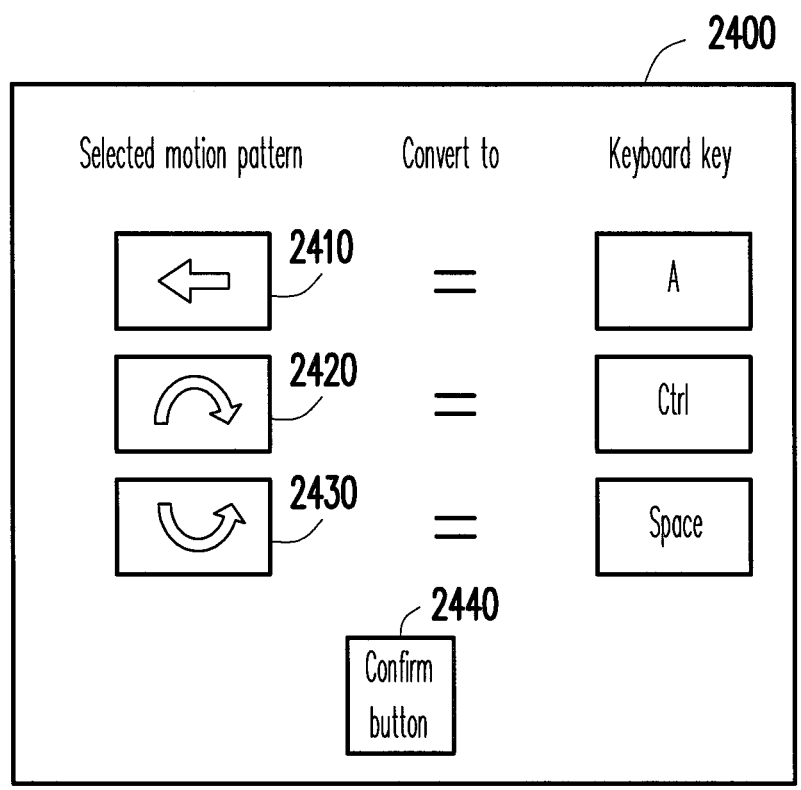

Referring to FIG. 24, if three motion patterns (i.e. the left drive 2410, forehand cut 2420 and forehand lob 2430) are selected by the user, they are respectively converted into corresponding keyboard keys (i.e. character key "A", control key "Ctrl" and space key "Space") and used for setting the mapping tool transformation.

To sum up, based on aforesaid method, a user may combine any motion patterns under various motion groups or motion types and apply those motion patterns to various device operations. A service end device in a remote end automatically re-compiles a customized motion library according to the selected motion patterns and provides the same for the device of the user, such that once the user performs the pre-selected motion on the device, the motion can be recognized either directly by the device itself or indirectly by the service end device, thus accelerating the recognition of motion and providing flexibility for the user to choose desired motion and define operations corresponding to the motion.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for providing a motion library, adapted to a service end device to provide a customized motion library supporting recognition of at least one motion pattern for a user end device, the method comprising:
   determining at least one sensing component disposed on the user end device;
   determining at lease one motion group according to the determined sensing components, wherein each motion group comprises at least one motion pattern;
   querying a motion database to display a list of the motion groups corresponding to the determined sensing components and selecting the motion groups from the list;
   selecting one or a plurality of the motion patterns corresponding to the selected motion groups;
   selecting the motion patterns belonging to the motion groups to re-compile the customized motion library; and
   providing the customized motion library for the user end device so as to enable the user end device to recognize the selected motion patterns.

2. The method according to claim 1, wherein the step of selecting the motion patterns belonging to the motion groups to re-compile the customized motion library comprises:
   retrieving a plurality of motion pattern trajectory data defined in the motion patterns selected from the selected motion groups and from the motion patterns corresponding to the selected motion groups;
   converting the motions patterns into a plurality of motion vectors;
   training a motion model of the converted motion vectors through a recognition algorithm, so as to obtain a plurality of training parameters of the motion model corresponding to the selected motion patterns; and
   compiling the training parameters into the customized motion library.

3. The method according to claim 1, wherein the at least one motion pattern further comprises being classified into at least one motion type, such that each motion group comprises one or a plurality of the at least one motion type and each motion type comprises one or a plurality of the at least one motion pattern.

4. The method according to claim 3, wherein the step of selecting one or a plurality of the motion patterns corresponding to the selected motion groups, and selecting the motion patterns belonging to the motion groups to re-compile the customized motion library comprises:
   selecting one or a plurality of the motion types corresponding to the selected motion groups or one or a plurality of the motion patterns corresponding to the selected motion groups or motion types;
   retrieving a plurality of motion trajectory data defined in the selected motion patterns from the selected motion groups and from the motion patterns corresponding to the selected motion types belonging to the selected motion groups;
   converting the motions patterns into a plurality of motion vectors;
   training a motion model of the converted motion vectors through a recognition algorithm, so as to obtain a plurality of training parameters of the motion model corresponding to the selected motion patterns; and
   compiling the training parameters into the customized motion library.

5. The method according to claim 1, wherein the step of providing the customized motion library for the user end device so as to enable the user end device to recognize the selected motion patterns comprises:
   sending the customized motion library to the user end device; and
   installing the customized motion library on the user end device so as to enable the user end device to recognize the selected motion patterns.

6. The method according to claim 5, wherein the step of sending the customized motion library to the user end device comprises:
   downloading the customized motion library by an intermediary device; and
   connecting with the user end device and sending the downloaded customized motion library to the user end device by the intermediary device.

7. The method according to claim 5, wherein after the step of installing the customized motion library on the user end device so as to enable the user end device to recognize the selected motion patterns, the method further comprises:
   respectively applying the selected motion patterns to a device operation of the user end device; and
   recognizing the motion pattern according to the installed customized motion library and executing the device operation corresponding to the motion pattern.

8. The method according to claim 7, wherein the step of the user end device recognizing the motion pattern according to the installed customized motion library and executing the device operation corresponding to the motion pattern comprises:
   detecting a movement thereof by using the sensing components;
   interpreting the movement detected by the sensing components by using the installed customized motion library, so as to recognize the motion pattern performed thereon; and
   executing the device operation corresponding to the motion pattern.

9. The method according to claim 1, wherein the step of providing the customized motion library for the user end device so as to enable the user end device to recognize the selected motion patterns comprises:
   providing a mapping tool for the user end device, so as to map the motion pattern recognized by the user end device to an input operation of an input device in the user end device; and
   performing the input operation of the input device.

10. The method according to claim 9, wherein the customized motion library is loaded to the mapping tool to enable the user end device to recognize the motion pattern.

11. The method according to claim 1, wherein the step of providing the customized motion library for the user end device so as to enable the user end device to recognize the selected motion patterns further comprises:
   executing the customized motion library and interpreting the movement detected by each of the at least one sensing components of the user end device by using the customized motion library, so as to recognize the motion pattern performed on the user end device;
   respectively applying the selected motion patterns to a device operation of the user end device; and
   executing the device operation corresponding to the recognized motion pattern according to the motion pattern recognized by the service end device.

12. The method according to claim 1, wherein the step of providing the customized motion library for the user end device so as to enable the user end device to recognize the selected motion patterns further comprises:
   executing the customized motion library and interpreting the movement detected by each of the at least one sensing components of the user end device by using the customized motion library, so as to recognize the motion pattern performed on the user end device;
   loading the customized motion library to a mapping tool;
   maps the recognized motion pattern of the user end device to an input operation of an input device in the user end device by using the mapping tool;
   transmitting the input operation of the input device to the user end device; and
   performing the input operation of the input device.

13. An apparatus for providing a motion library, comprising:
   a storage module, configured to store a motion database which records at least one motion library required for recognizing at least one motion pattern;
   a communication module, configured to connect with a user end device;
   a determination module, configured to determine at least one sensing component disposed on the user end device, and determine at least one motion group according to the determined at least one sensing component, wherein each motion group comprises at least one motion pattern;
   an input module, configured to receive a selecting operation of one or a plurality of the at least one motion pattern; and
   a processing module, configured to query the motion database to display a list of the motion groups corresponding to the determined sensing components, select the motion groups from the list, select one or a plurality of the motion patterns corresponding to the selected motion groups, select the motion patterns belonging to the corresponding motion group to re-compile a customized motion library, and provide the customized motion library for the user end device so as to enable the user end device to recognize the selected motion patterns.

14. The apparatus according to claim 13, wherein the processing module comprises:
   a retrieving unit, configured to retrieve a plurality of motion trajectory data defined in the motion patterns selected from the selected motion groups and from the motion patterns corresponding to the selected motion groups;
   a converting unit, configured to convert the motion trajectory data into a plurality of motion vectors;
   a training unit, configured to train a motion model of the converted motion vectors through a recognition algorithm, so as to obtain a plurality of training parameters of the motion model corresponding to the selected motion patterns; and
   a compiler, configured to input the training parameters into a recognition system and compiler the training parameters into the customized motion library.

15. The apparatus according to claim 13, wherein the at least one motion patterns are further classified into at least one motion type such that each motion group comprises one or a plurality of the at least one motion type and each motion type comprises one or a plurality of the at least one motion patterns.

16. The apparatus according to claim 15, wherein the processing module further selects one or a plurality of the motion types corresponding to the selected motion groups or one or a plurality of the motion patterns corresponding to the selected motion groups or motion types, selects the motion patterns belonging to the motion types of the corresponding motion group, and re-compiles the same as the customized motion library.

17. The apparatus according to claim 13, wherein the customized motion library is sent to the user end device through the communication module and installed on the user end device, so as to enable the user end device to recognize the selected motion patterns.

18. The apparatus according to claim 13, wherein the processing module further provides a mapping tool for the user end device, so as to map the motion patterns recognized by the user end device to an input operation of an input device in the user end device and transmit the input operation to the user end device for execution, and loads the customized motion library to the mapping tool and provides the mapping tool for the user end device, so as to enable the user end device to recognize the motion patterns.

19. The apparatus according to claim 13, wherein the processing unit interprets a motion detected by each of the at least one sensing components of the user end device by using the customized motion library, so as to recognize the motion pattern performed on the user end device.

20. The apparatus according to claim 13, wherein the processing module further maps the recognized motion pattern of the user end device to an input operation of an input device in the user end device and transmits the input operation of the input device to the user end device for execution.

* * * * *